US012704194B2

(12) United States Patent
Mitri et al.

(10) Patent No.: US 12,704,194 B2
(45) **Date of Patent: *Aug. 11, 2026**

(54) MULTI-WAY VALVE

(71) Applicant: Stant USA Corp., Connersville, IN (US)

(72) Inventors: George J. Mitri, Connersville, IN (US); John C. Long, Connersville, IN (US); Rick McQuiston, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/502,705

(22) Filed: Nov. 6, 2023

(65) Prior Publication Data

US 2024/0151318 A1 May 9, 2024

Related U.S. Application Data

(60) Provisional application No. 63/423,278, filed on Nov. 7, 2022.

(51) Int. Cl.

| | |
|---|---|
| ***F16K 27/04*** | (2006.01) |
| ***F16K 11/22*** | (2006.01) |
| ***F16K 27/12*** | (2006.01) |
| ***F16K 31/524*** | (2006.01) |
| *F16K 31/04* | (2006.01) |

(52) U.S. Cl.

CPC ............ *F16K 27/041* (2013.01); *F16K 11/22* (2013.01); *F16K 27/12* (2013.01); *F16K 31/52483* (2013.01); *F16K 31/043* (2013.01); *F16K 2200/50* (2021.08)

(58) Field of Classification Search

CPC ........ F16K 11/16; F16K 11/166; F16K 11/22; F16K 27/041

See application file for complete search history.

(56) References Cited

U.S. PATENT DOCUMENTS

| | | | | |
|---|---|---|---|---|
| 2,708,094 | A * | 5/1955 | Heinen | F16K 5/184 251/163 |
| 3,251,408 | A | 5/1966 | Henry et al. | |
| 3,927,693 | A | 12/1975 | Johnston | |
| 4,429,717 | A | 2/1984 | Montgomery | |
| 4,655,252 | A * | 4/1987 | Krumhansl | F16K 11/0853 251/59 |
| 5,431,189 | A | 7/1995 | Jones | |
| 5,529,758 | A | 6/1996 | Houston | |
| 6,186,174 | B1 | 2/2001 | Yurchision et al. | |

(Continued)

FOREIGN PATENT DOCUMENTS

| | | |
|---|---|---|
| CN | 204610957 U | 9/2015 |
| CN | 107893865 A | 4/2018 |

(Continued)

*Primary Examiner* — Reinaldo Sanchez-Medina

(74) *Attorney, Agent, or Firm* — Barnes & Thornburg

(57) ABSTRACT

A multi-way valve adapted to control a flow of fluid to different thermal fluid circuits includes a valve housing, a valve flow controller, and a sealing system. The valve flow controller is arranged in the valve housing to control flow through the valve housing. The sealing system is configured to seal between the valve housing and the valve flow controller.

28 Claims, 45 Drawing Sheets

(56) References Cited

U.S. PATENT DOCUMENTS

| | | | | |
|---|---|---|---|---|
| 6,245,233 | B1 | 6/2001 | Lu | |
| 6,347,644 | B1 | 2/2002 | Channell | |
| 6,598,853 | B1 * | 7/2003 | Appleford | F16K 5/181 251/192 |
| 8,336,319 | B2 | 12/2012 | Johnston et al. | |
| 8,375,990 | B2 | 2/2013 | Veros | |
| 8,402,776 | B2 | 3/2013 | Johnston et al. | |
| 8,448,696 | B2 | 5/2013 | Johnston et al. | |
| 9,777,469 | B2 | 10/2017 | Wang | |
| 10,344,877 | B2 | 7/2019 | Roche et al. | |
| 10,665,908 | B2 | 5/2020 | Krull et al. | |
| 10,808,863 | B2 * | 10/2020 | Bugeja | F16K 11/165 |
| 10,851,901 | B2 | 12/2020 | Liberman et al. | |
| 10,967,702 | B2 | 4/2021 | Mancini et al. | |
| 11,084,404 | B2 | 8/2021 | Gupta et al. | |
| 11,168,797 | B2 | 11/2021 | Dragojlov et al. | |
| 11,247,529 | B2 | 2/2022 | Zhou et al. | |
| 11,383,578 | B2 | 7/2022 | Huang et al. | |
| 12,385,570 | B2 * | 8/2025 | Mitri | F16K 11/0876 |
| 2006/0118066 | A1 | 6/2006 | Martins | |
| 2006/0231146 | A1 | 10/2006 | Lillback | |
| 2008/0223464 | A1 | 9/2008 | Merrell | |
| 2010/0319796 | A1 | 12/2010 | Whitaker | |
| 2014/0053931 | A1 | 2/2014 | Whitaker | |
| 2014/0090414 | A1 | 4/2014 | Mclane et al. | |
| 2015/0354716 | A1 | 12/2015 | Morein | |
| 2017/0089474 | A1 | 3/2017 | Zhan et al. | |
| 2019/0039440 | A1 | 2/2019 | Calderone | |
| 2020/0011437 | A1 | 1/2020 | Lin et al. | |
| 2021/0331554 | A1 | 10/2021 | Mancini et al. | |
| 2022/0146003 | A1 | 5/2022 | Yu et al. | |
| 2022/0316609 | A1 * | 10/2022 | Tiemeyer | F16K 11/0853 |
| 2022/0390026 | A1 | 12/2022 | Chapman | |

FOREIGN PATENT DOCUMENTS

| | | | |
|---|---|---|---|
| CN | 106090315 | B | 8/2018 |
| CN | 112682541 | A | 4/2021 |
| CN | 214743520 | U | 11/2021 |
| CN | 214946603 | U | 11/2021 |
| CN | 214999563 | U | 12/2021 |
| CN | 215059741 | U | 12/2021 |
| CN | 215950468 | U | 3/2022 |
| CN | 114688306 | A | 7/2022 |
| CN | 217207877 | U | 8/2022 |
| CN | 217539713 | U | 10/2022 |
| CN | 114635991 | B | 3/2023 |
| CN | 220102162 | A | 11/2023 |
| CN | 221780053 | U | 9/2024 |
| DE | 10153222 | B4 | 7/2012 |
| DE | 202014102795 | U1 | 6/2014 |
| DE | 102021101096 | A1 | 7/2022 |
| JP | H1144369 | A | 2/1999 |
| JP | 2002022041 | A | 1/2002 |
| WO | 2022057588 | A1 | 3/2022 |

* cited by examiner

| MODE | LOOP 1 | LOOP 2 | LOOP 3 | DISCONNECT |
|---|---|---|---|---|
| A | 6、7 | 1、2 | 5、3 | 4 |
| B1 | 6、7 | 1、2 | 5、3 | 4 |
| B2 | 1、7 | 1、2 | 5、3 | 4 |
| B3 | 1、7 & 6 | 1、2 | 5、3 | 4 |
| C | 1、7 | 1、2 | 3、5 | 4 |
| D | 6、7 | 1、4 | 2、3 | 5 |
| E | ALL PORT CONNECT | | | |

*FIG. 10*

MULTI-WAY VALVE

PRIORITY CLAIM

This application claims priority to and the benefit of U.S. Provisional Patent Application No. 63/423,278, filed 7 Nov. 2022, the disclosure of which is now expressly incorporated herein by reference.

BACKGROUND

The present disclosure relates to multi-way valves, and particularly to multi-way valves for controlling the flow of heating and/or fluid to various thermal fluid circuits in a vehicle. More particularly, the present disclosure relates to an electro mechanical multi-way valve.

SUMMARY

A multi-way valve in accordance with the present disclosure includes a valve housing and a valve flow controller positioned in the housing to control the flow of fluid through the valve housing. The flow of heating and/or cooling fluid is controlled to direct fluid to different thermal fluid circuits in a vehicle.

In the illustrative embodiments, the valve housing includes a valve housing body coupled to a manifold of the thermal fluid circuits, a first housing end cover, and a second housing end cover. The valve housing body shaped to define a first valve cavity, a second valve cavity in fluid communication with the first valve cavity, and a plurality of apertures that open into the first and second valve cavities. The first housing end cover is coupled to the first end of the valve housing to close a first end opening to the first valve cavity. The second end cover coupled to the second end of the valve housing to close a second end opening to the second valve cavity.

In the illustrative embodiment, the valve flow controller includes a first valve rotor arranged in the first valve cavity of the valve housing body and a second valve rotor arranged in the second valve cavity of the valve housing body. The first valve rotor and the second valve rotor are each configured to rotate relative to the valve housing body about a valve axis. The first and second valve rotors cooperate to define a plurality of flow paths in the valve housing when the first and second valves are rotated about the valve axis to control the flow of fluid through the valve housing.

In the illustrative embodiment, the valve flow controller of the multi-way valve further includes actuators each coupled to the respective valve rotors to control rotation of the valve rotors about the respective rotor axis. The actuators rotate the first and second valve rotor to different predetermined positions relative to the valve housing to establish different flow paths through the housing.

In the illustrative embodiment, the multi-way vale further includes a first sealing system configured to form a seal engagement between the first valve rotor and the valve housing body of the valve housing. The first sealing system includes a first seal that extends circumferentially partway around the valve axis and is located between the first valve rotor and the valve housing body.

In the illustrative embodiment, the first sealing system further includes a first biasing assembly configured to apply a radial force on the first valve rotor when the first valve rotor is in preselected positions relative to the valve housing body. The first biasing assembly selectively applies the radial force to the first valve rotor to urge the first valve rotor into a predetermined level of engagement with the first seal when the first valve rotor is in one of the different preselected positions.

In the illustrative embodiment, the multi-way vale further includes a second sealing system configured to form a seal engagement between the second valve rotor and the valve housing body of the valve housing. The second sealing system includes a second seal that is located in a connecting aperture formed in the valve housing body.

In the illustrative embodiment, the second sealing system further includes a second biasing assembly configured to apply an axial force on the second valve rotor when the second valve rotor is in preselected positions relative to the valve housing body. The second biasing assembly selectively applies the axial force to the second valve rotor to urge the second valve rotor into a predetermined level of engagement with the second seal when the second valve rotor is in one of the different preselected positions.

This increased engagement of the valve rotors with the corresponding seals improves sealing between the valve rotors and the valve housing body and reduces leakage therebetween. This increased engagement of the each valve rotor with the corresponding seal applied only at preselected positions also reduces the amount of torque needed to rotate the valve rotors between various positions and reduces wear on the seals themselves.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing, a valve flow controller having a first and second valve rotors configured to be arranged in a corresponding cavity of the valve housing to control a flow of fluid through the valve housing, and first and second sealing systems each having seals configured to seal between one of the first and second valve rotors of the valve flow controller and the valve housing;

FIG. 3 is an exploded view of the multi-way valve of FIG. 1 showing the valve housing includes a valve housing body shaped to define a first valve cavity and a second valve cavity in fluid communication with the first valve cavity, a first housing end cover configured to be coupled to a first end of the valve housing to close a first end opening to the first valve cavity, and a second end cover configured to be coupled to a second end of the valve housing spaced apart axially from the first end of the valve housing relative to a valve axis to close a second end opening to the second valve cavity, and further showing the valve flow controller includes a first valve rotor—also referred to as a main valve rotor—configured to be arranged in the first valve cavity, a second valve rotor—also referred to as a throttle valve rotor—configured to be arranged in the second valve cavity of the valve housing body, and an actuator coupled to the main and throttle valve rotors to rotate the main and throttle rotors relative to the valve housing body about the valve axis to define a plurality of flow paths to control the flow of fluid through the valve housing;

FIG. 4 is an exploded view of the valve housing body and the valve flow controller with a portion of the valve housing broken away to show the valve housing body includes an annular outer wall that extends around the valve axis to define a hollow space, a partition wall located in the hollow space of the annular outer wall to divide the hollow space into the first valve cavity and the second valve cavity and defines a connecting aperture that connects the first and second valve cavities, and a housing base that extends from the outer wall to defined a plurality of apertures that open into the first and second valve cavities, and further showing the first biasing assembly includes a ridge that extends radially inward from the annular outer wall into the first cavity to engage the first valve rotor;

FIG. 5 is a perspective view of the main valve rotor included in the valve flow controller of the multi-way valve of FIG. 1 showing the main valve rotor includes a valve rotor body and a first valve shaft that extends axially from the valve rotor body through the second valve rotor to a terminal end configured to be couple to the actuator, and further showing the valve rotor body includes a first valve rotor drum that extends circumferentially about the valve axis, a plurality of circumferential flow divider walls that extend circumferentially at least partway around the first valve rotor drum, and a plurality of axial flow divider walls that extend axially along the first valve rotor drum between the circumferential flow divider walls to form a plurality of chambers as shown in FIGS. 6A-6D FIG. 5A is a detail view of FIG. 5 showing the first sealing system includes a first biasing assembly configured to selectively apply an axial force on the first valve rotor to urge the first valve rotor into engagement with the seals when the first valve rotor is in one of the different predetermined positions to improve sealing between the first valve rotor and the upper housing body, the first biasing assembly including protrusions formed on the main valve rotor that extends radially outward from the first valve rotor body that selectively engage the ridge on the valve housing body as suggested in FIGS. 27-28A as the first valve rotor rotates about the valve axis to the different predetermined positions to form a first biasing assembly configured to selectively apply a radial force on the first valve rotor to urge the first valve rotor into engagement with the seal located in the valve housing body when the first valve rotor is in one of the different predetermined positions to improve sealing between the first valve rotor and the valve housing body;

Figures 1, 2:
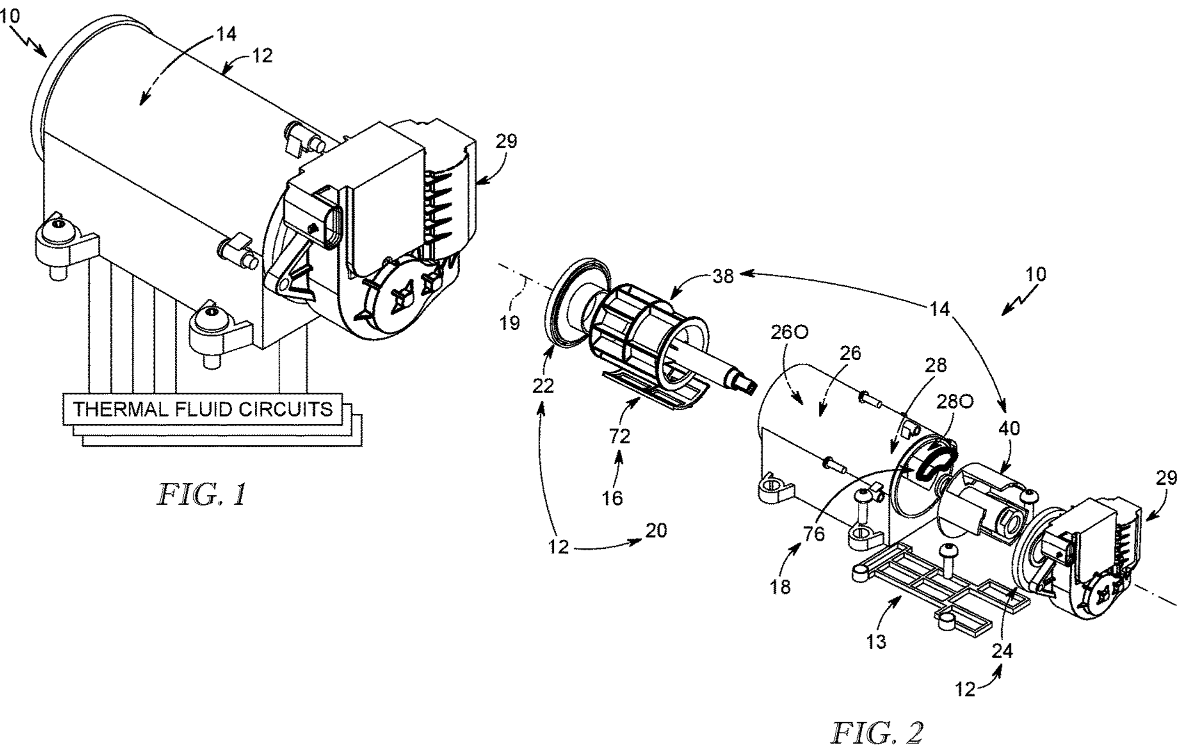
Figure 7:
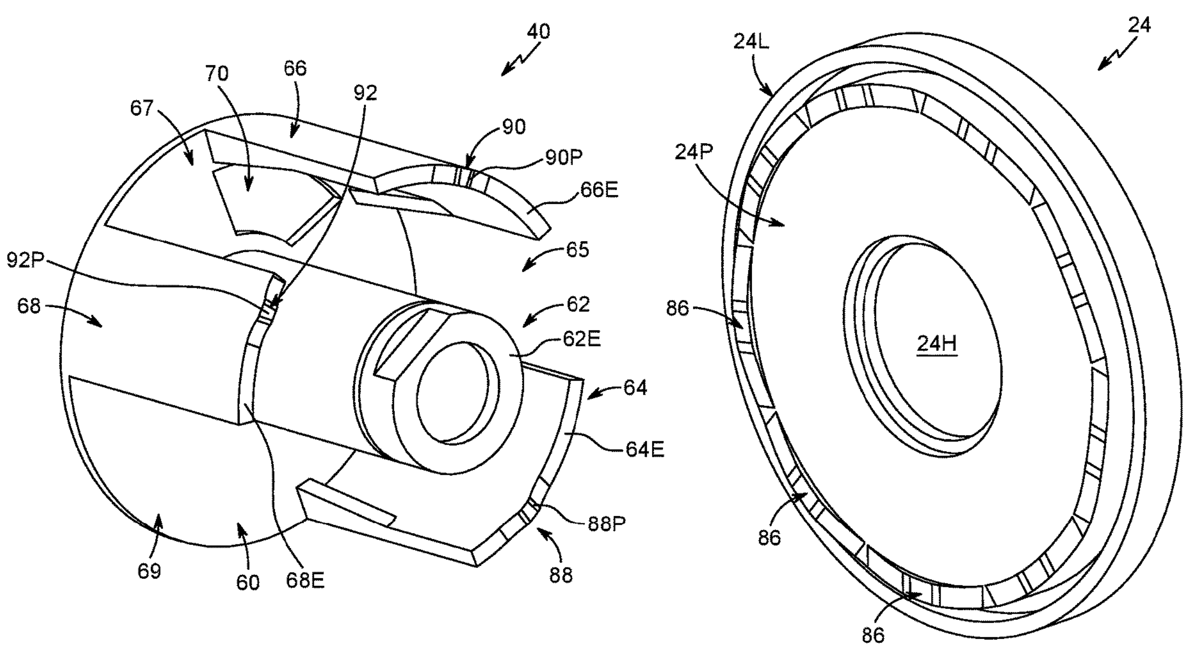
Figure 8:
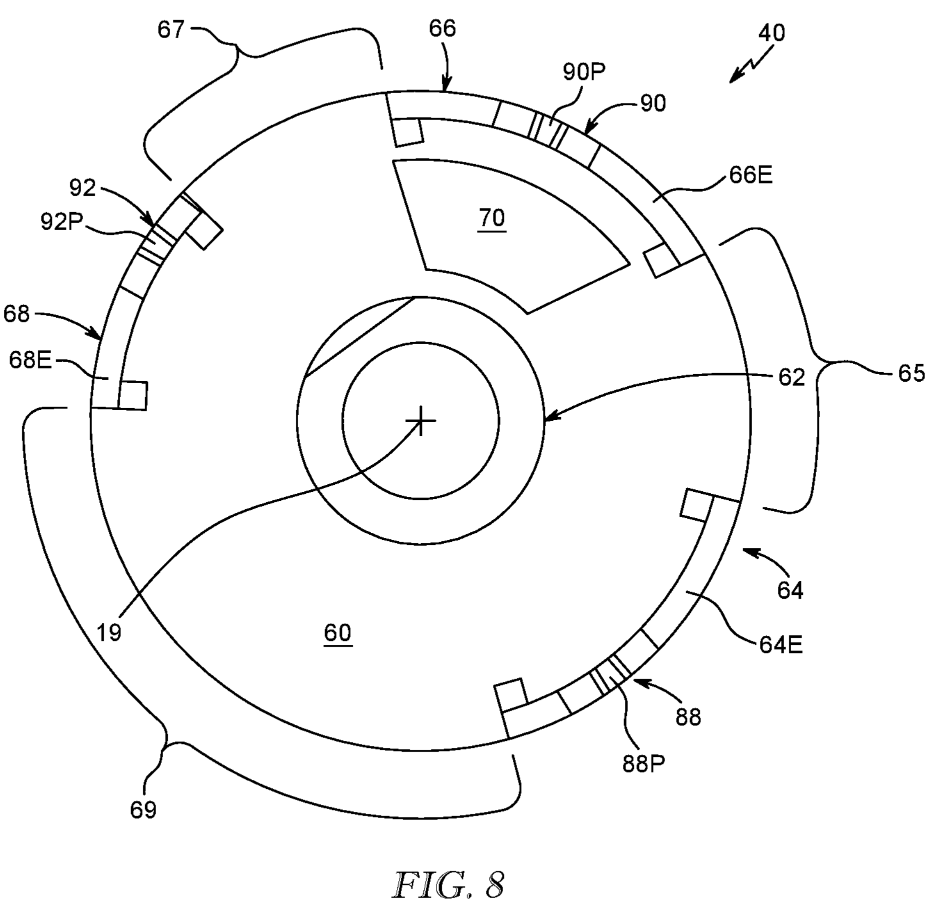
Figure 9:
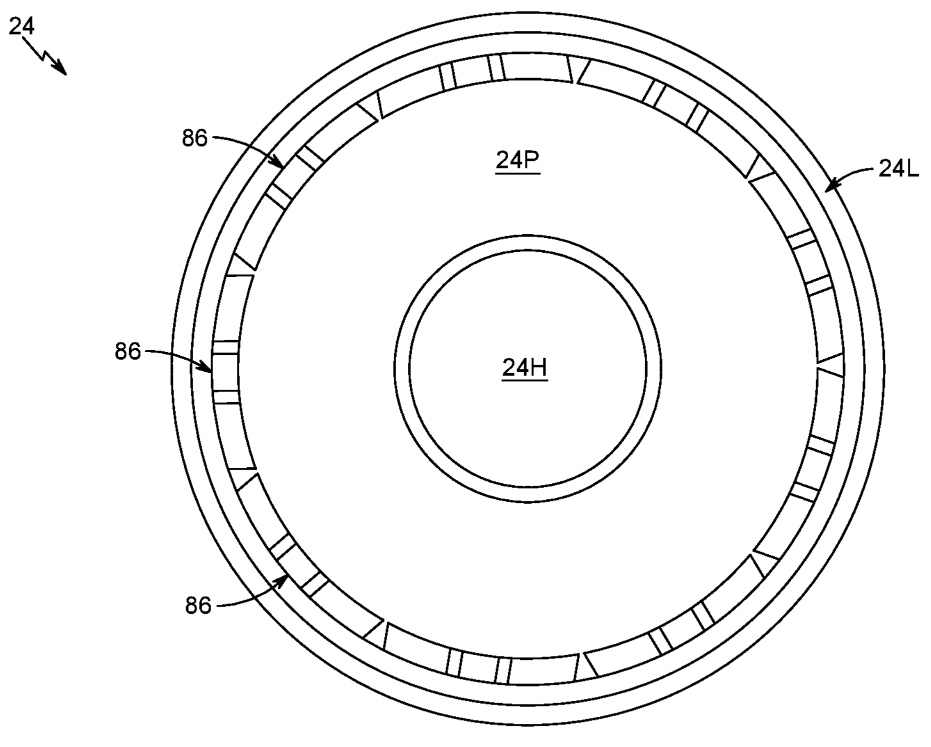
Figure 10A:
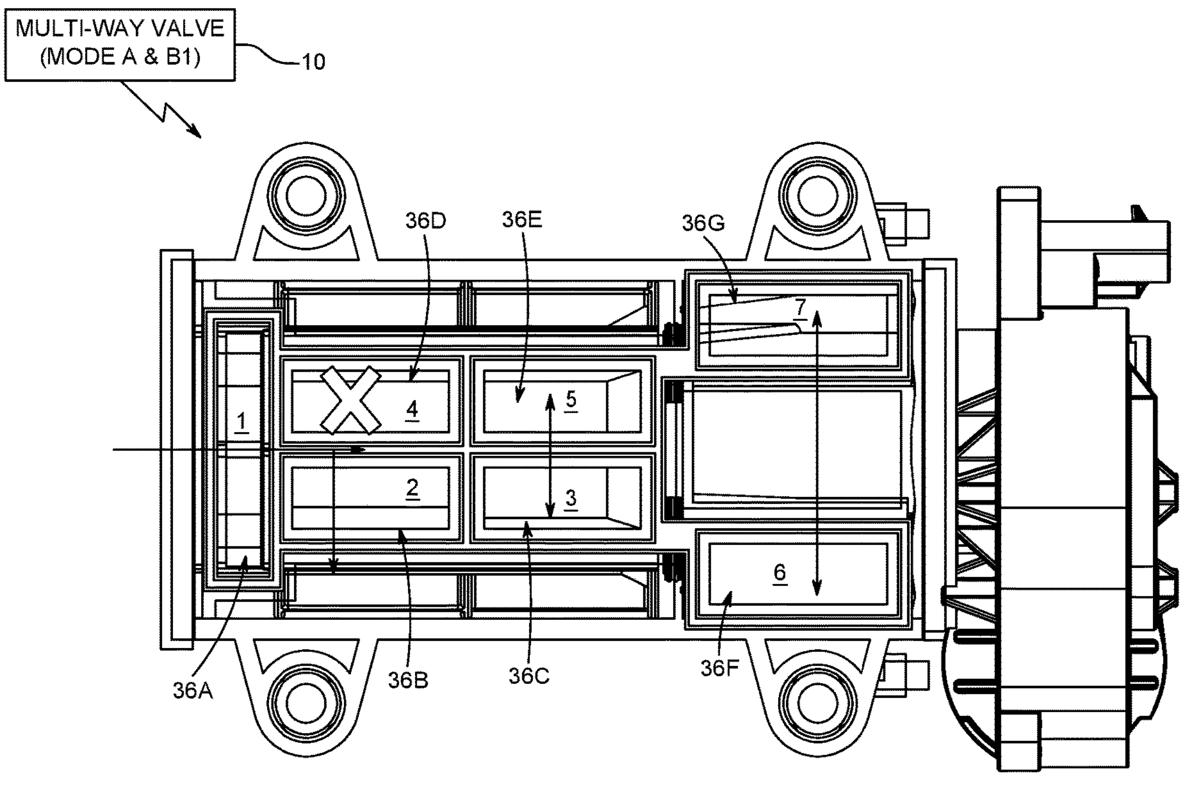
Figure 10B:
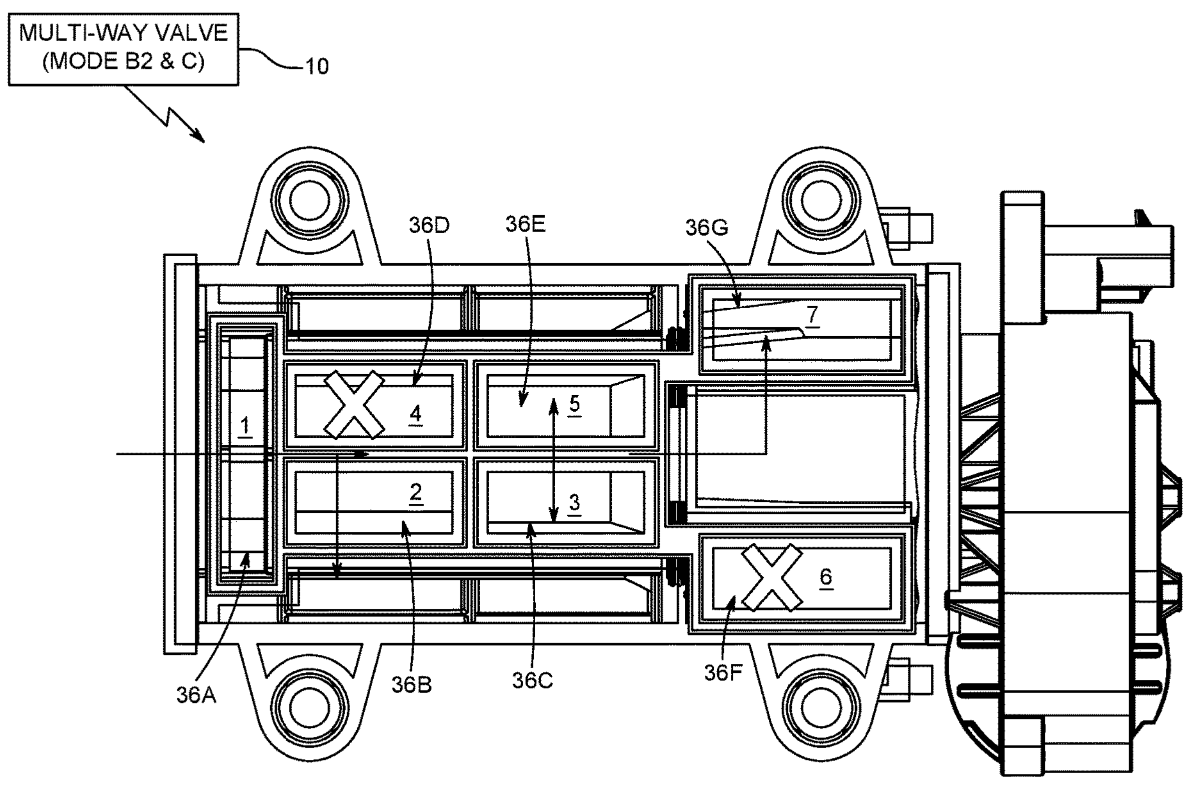
Figure 10C:
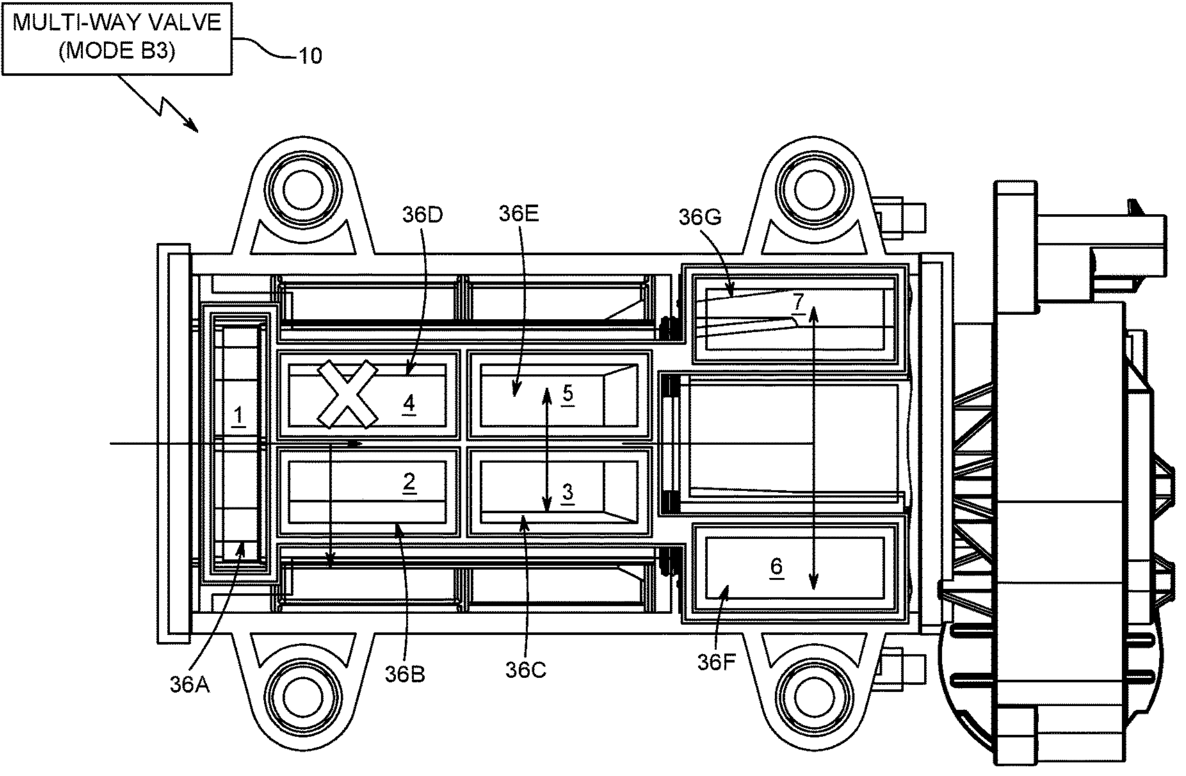
Figure 10D:
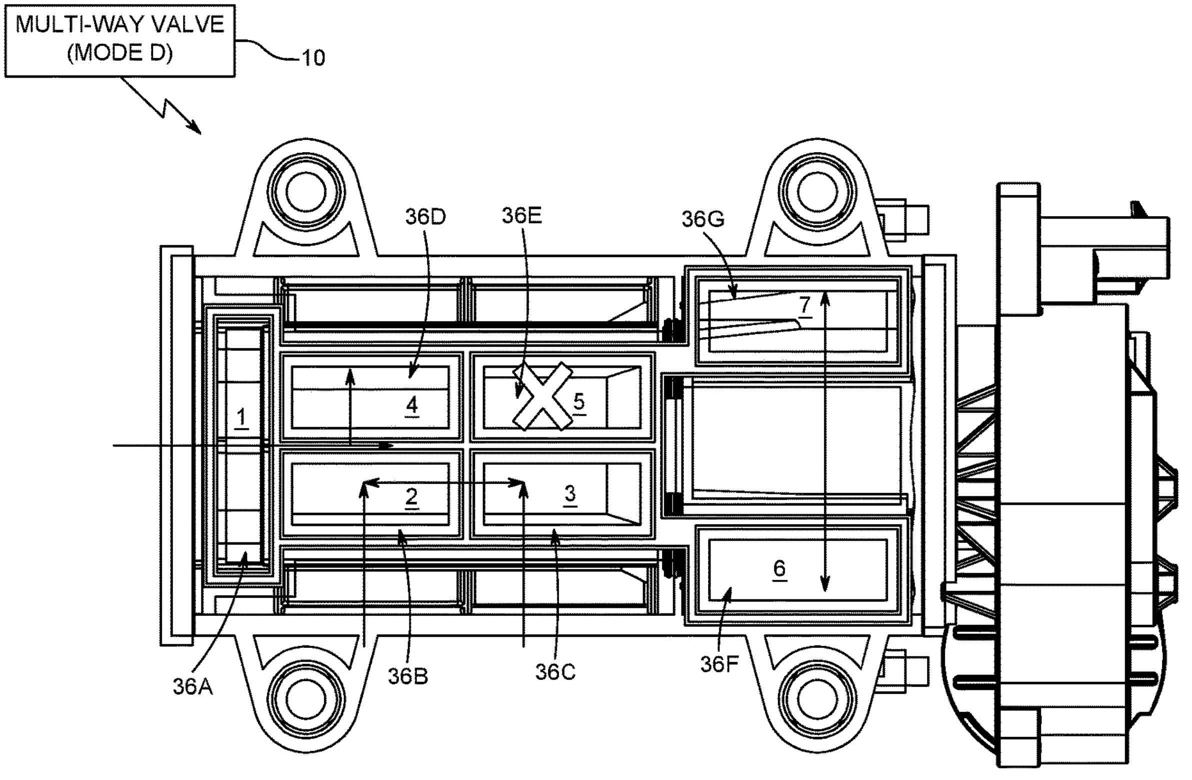
Figure 10E:
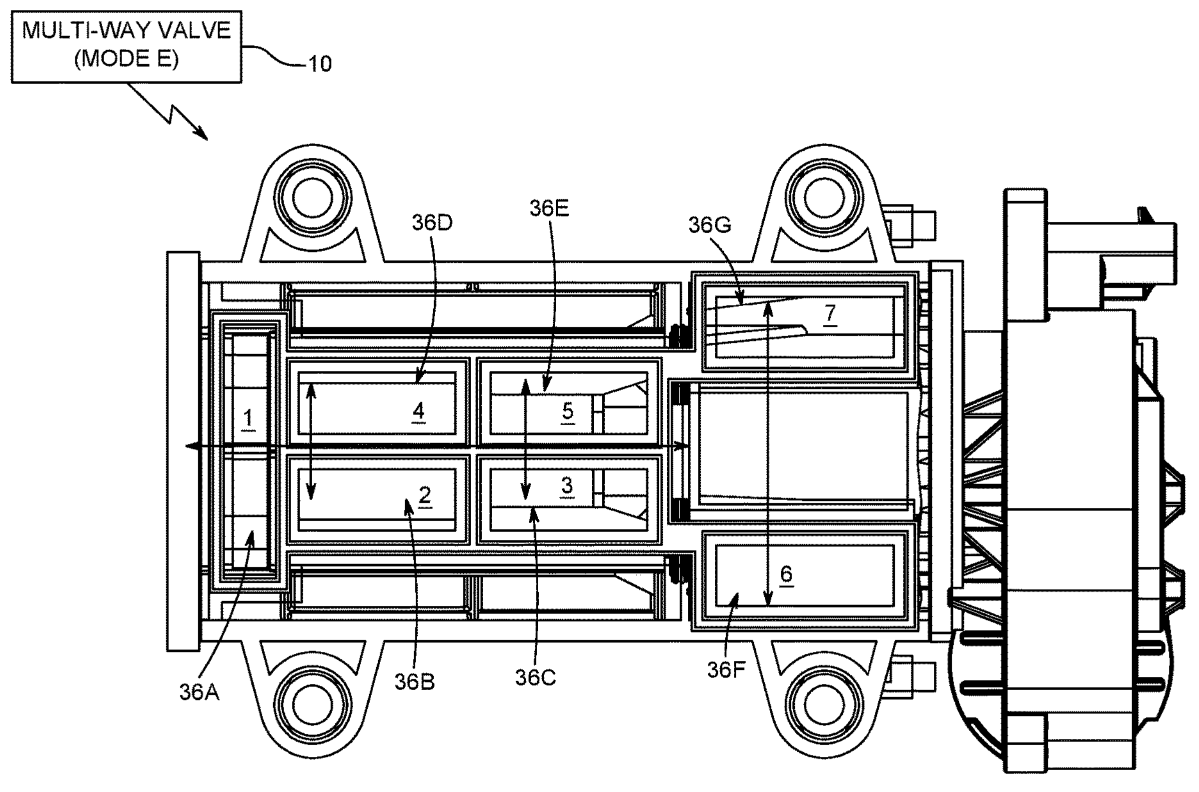
Figure 11:
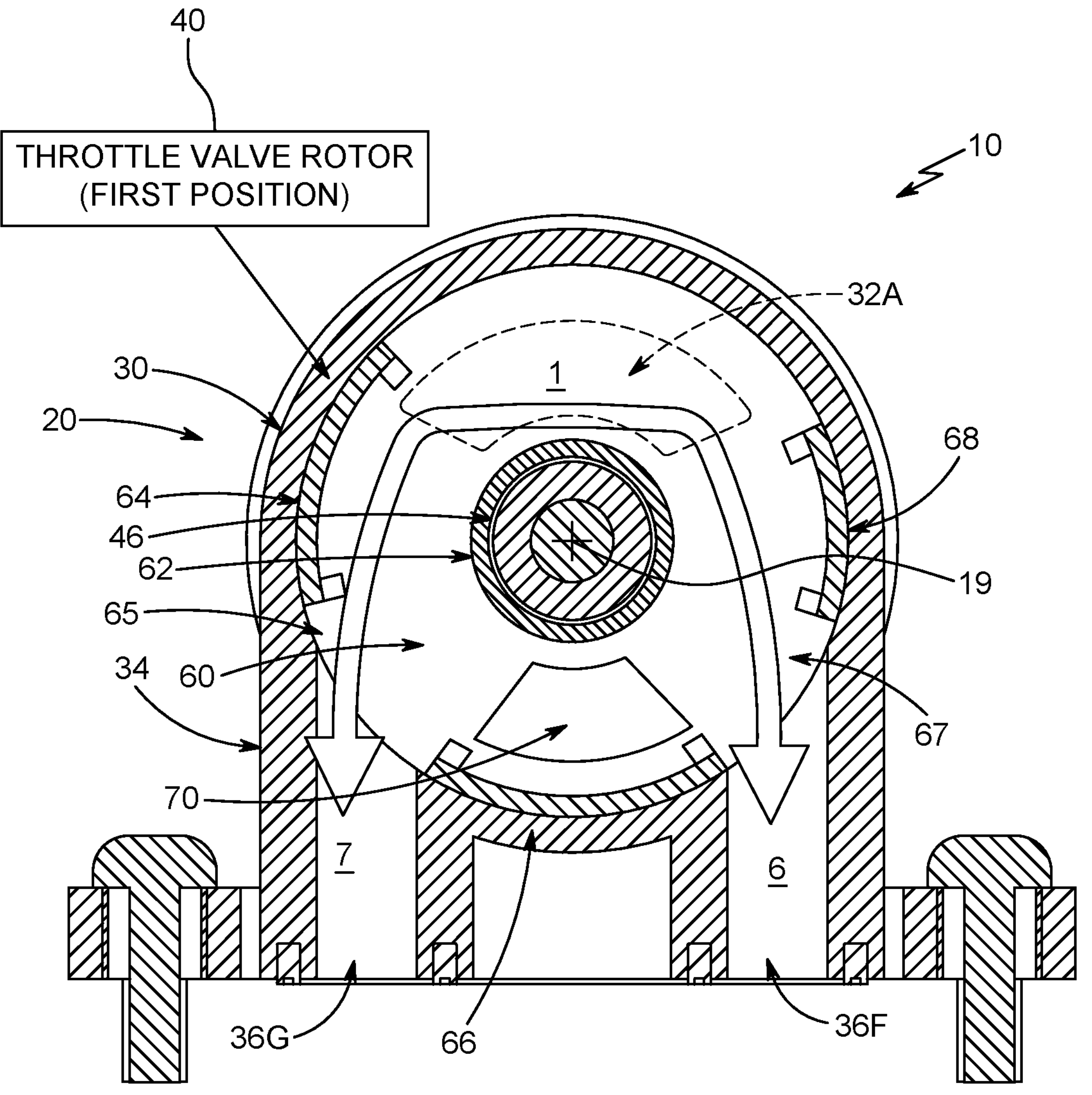
Figure 12:
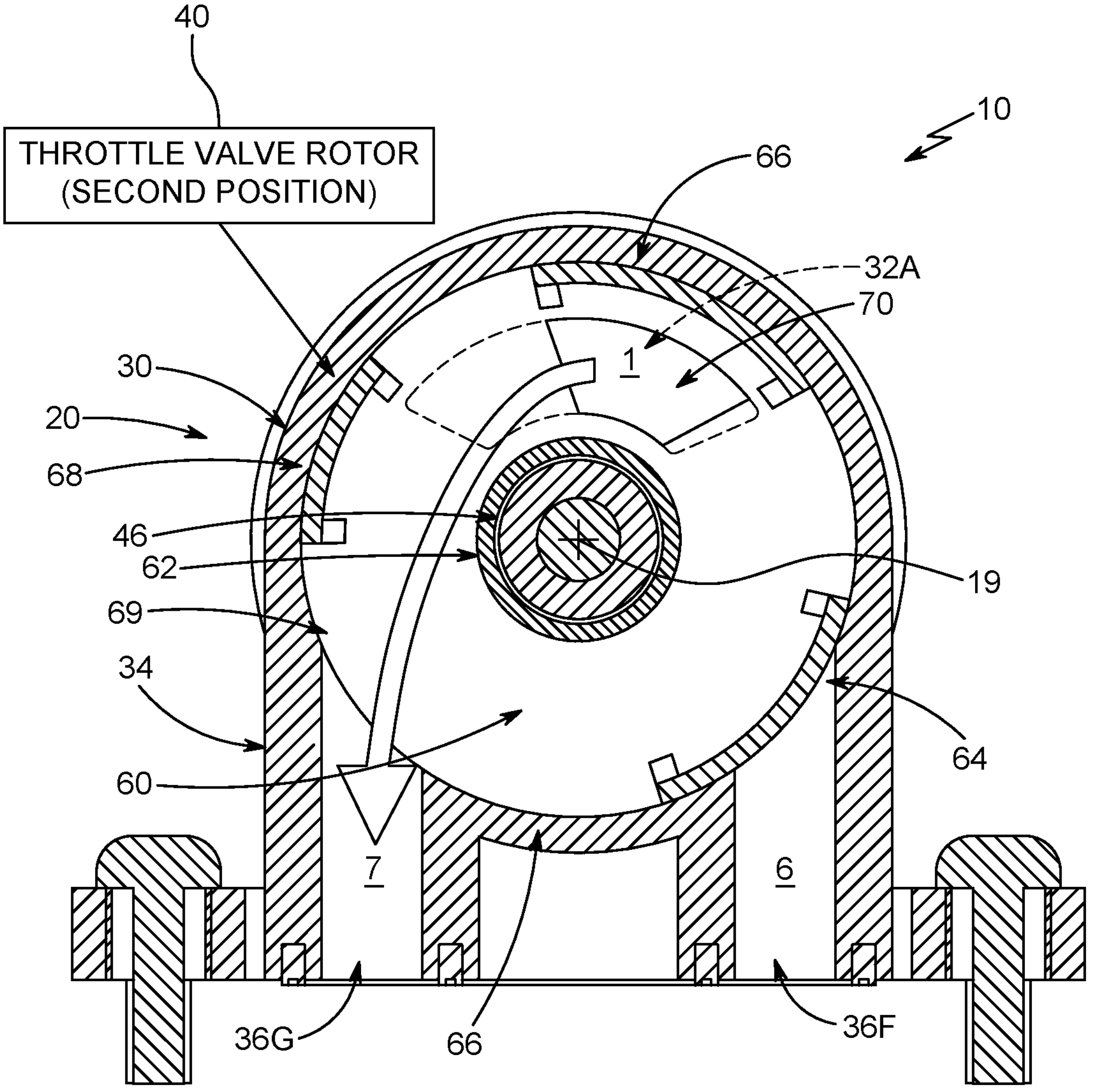
Figure 13:
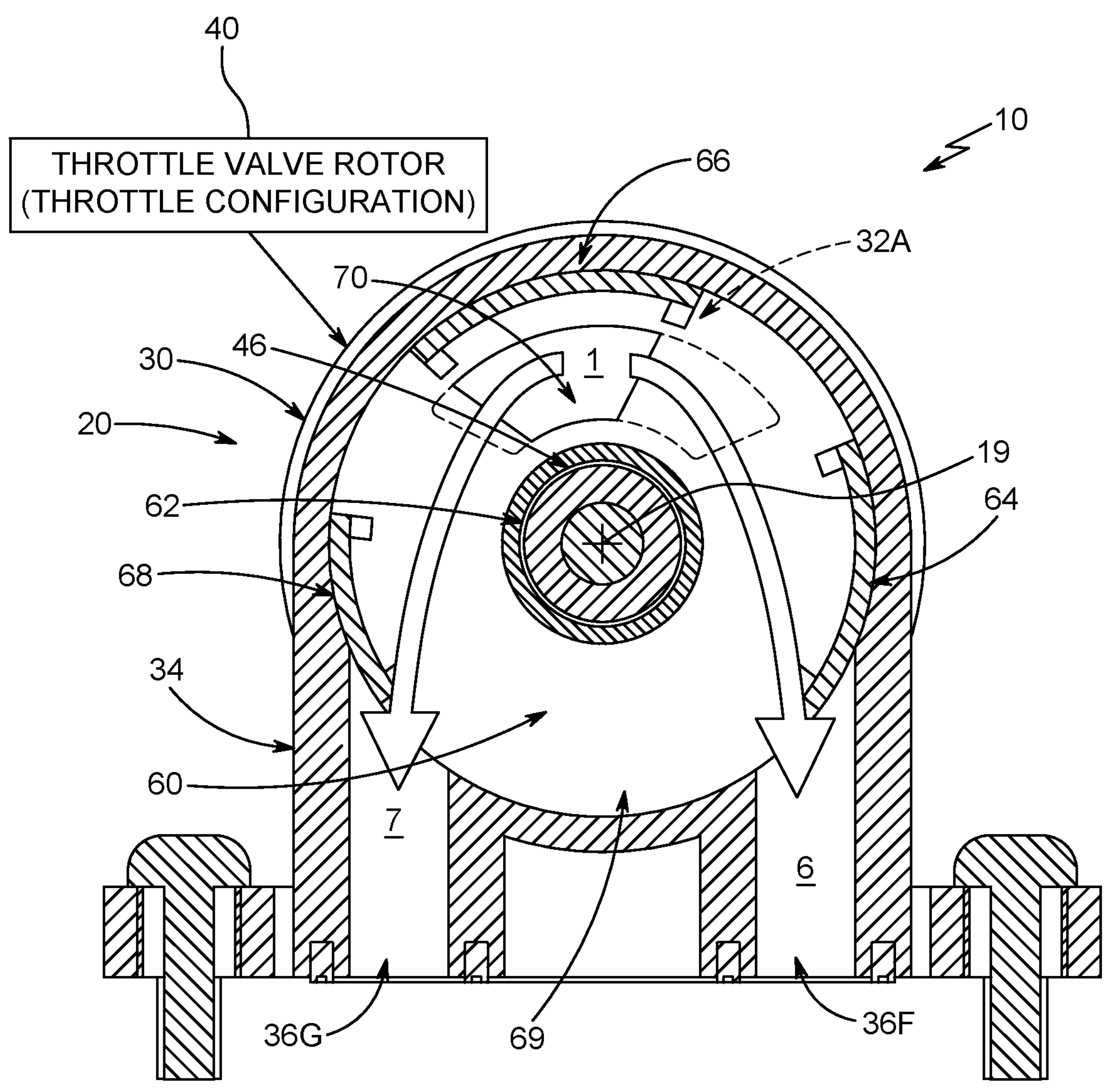
Figure 14:
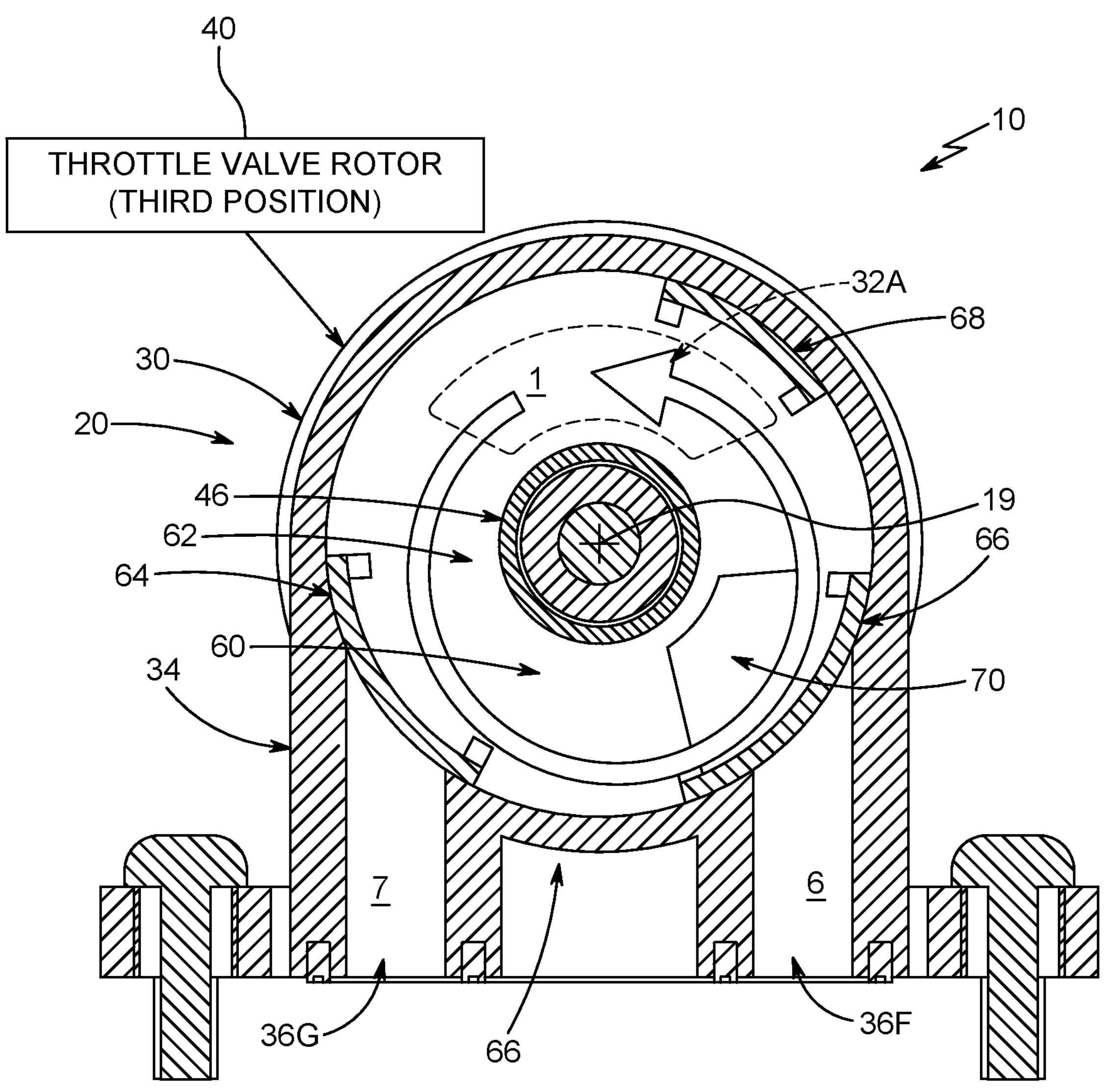
Figure 15:
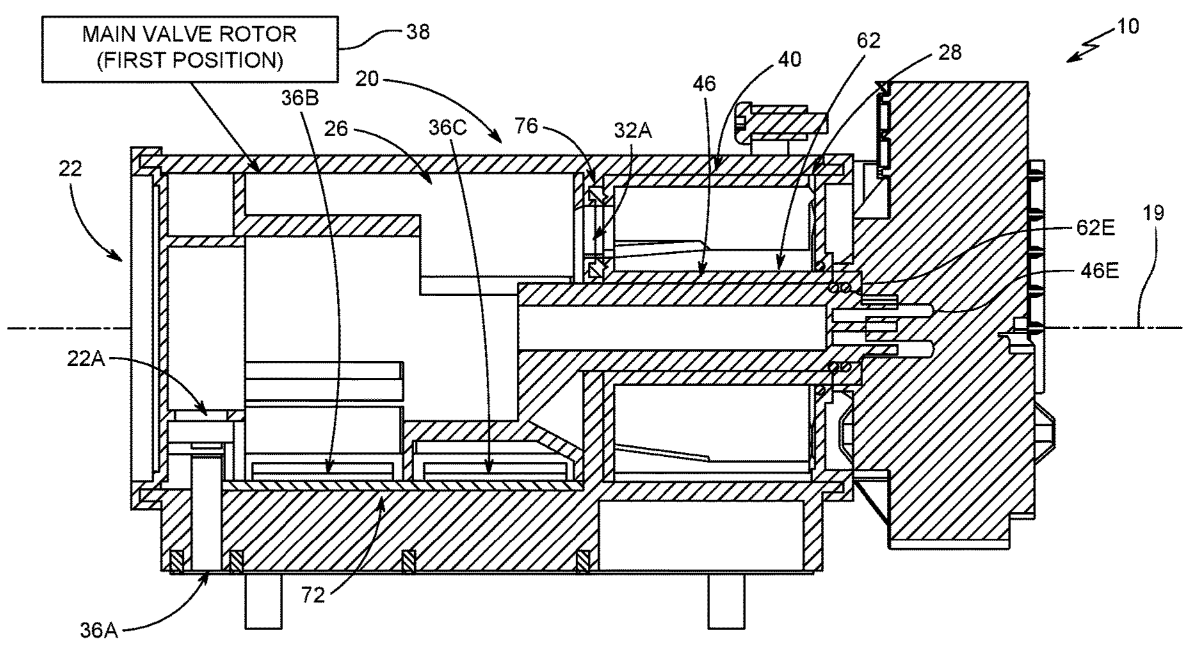
Figure 16A:
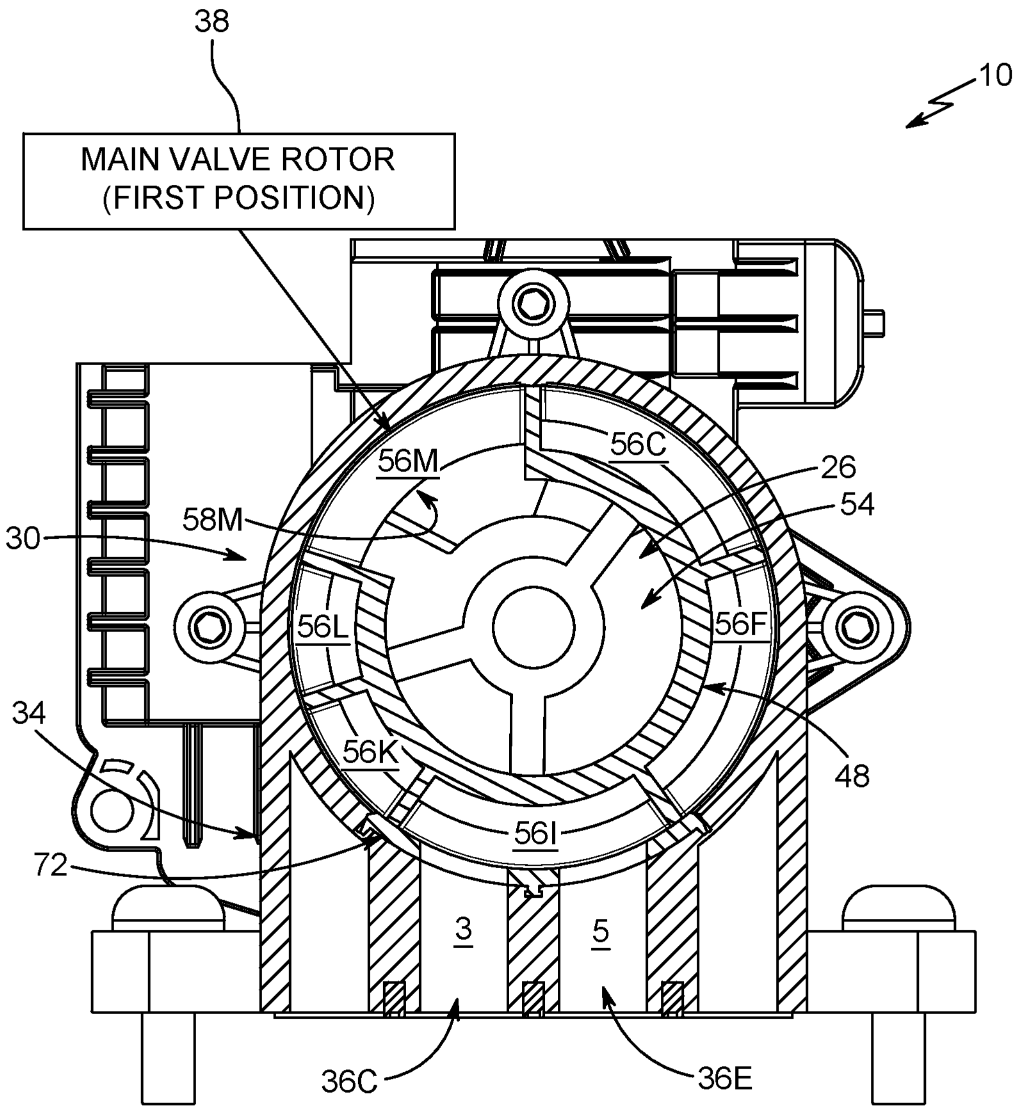
Figure 16B:
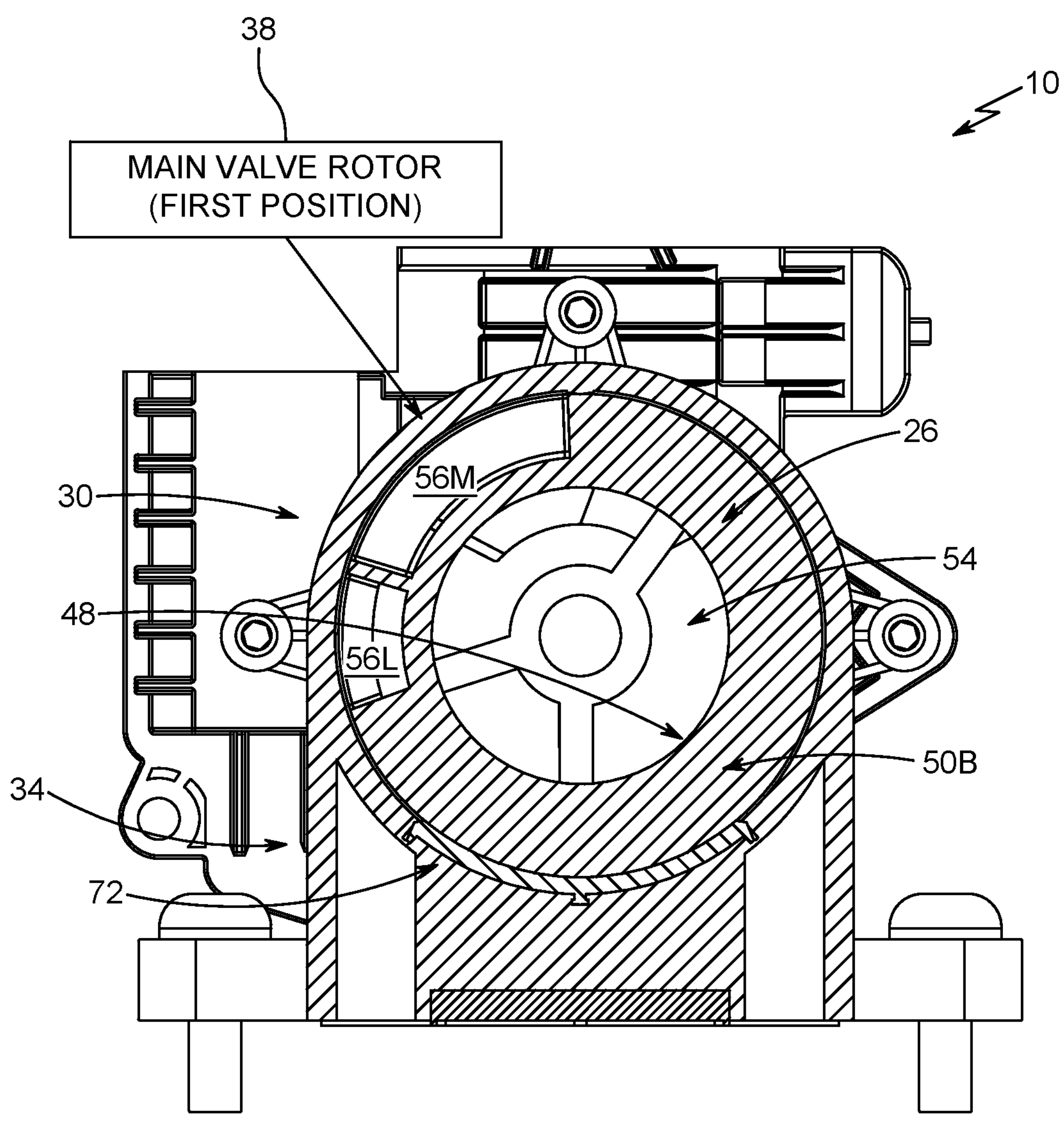
Figure 16C:
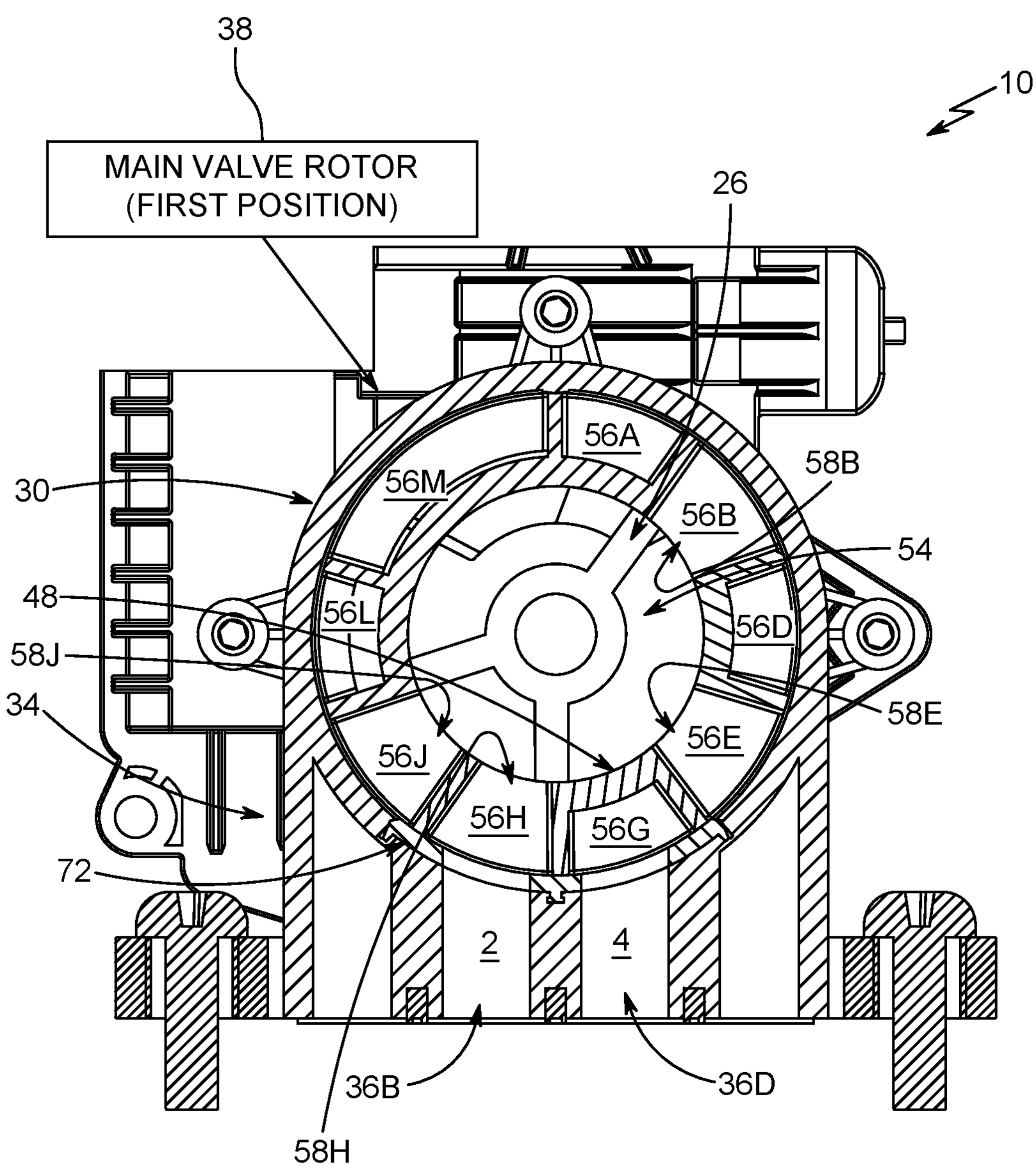
Figure 17:
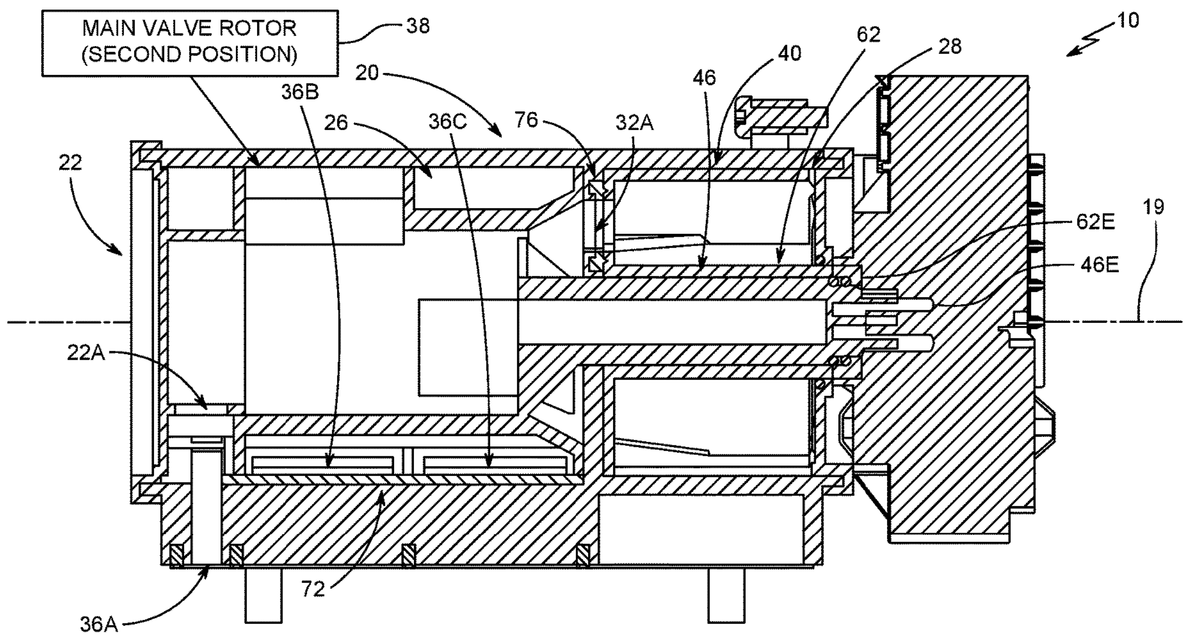
Figure 18A:
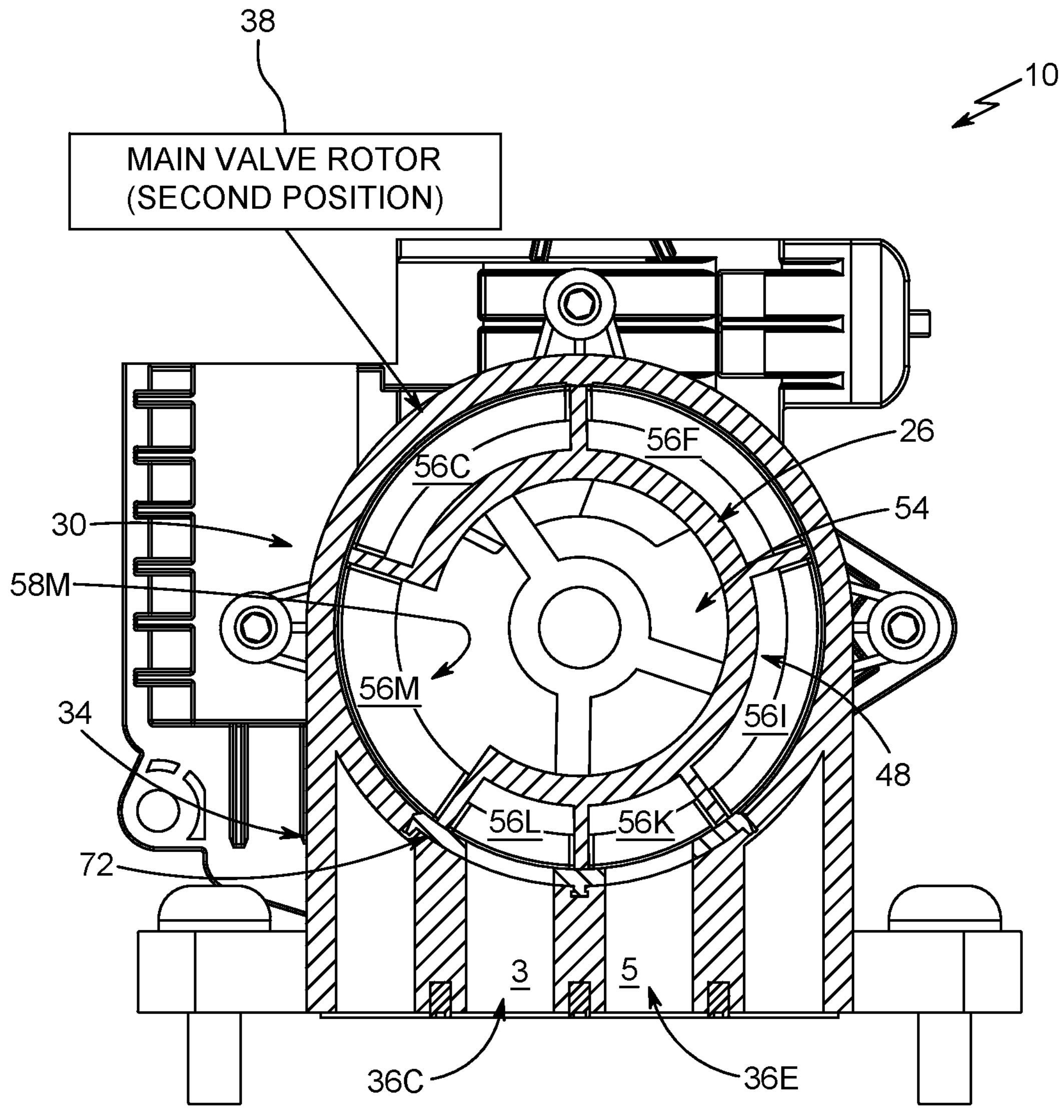
Figure 18B:
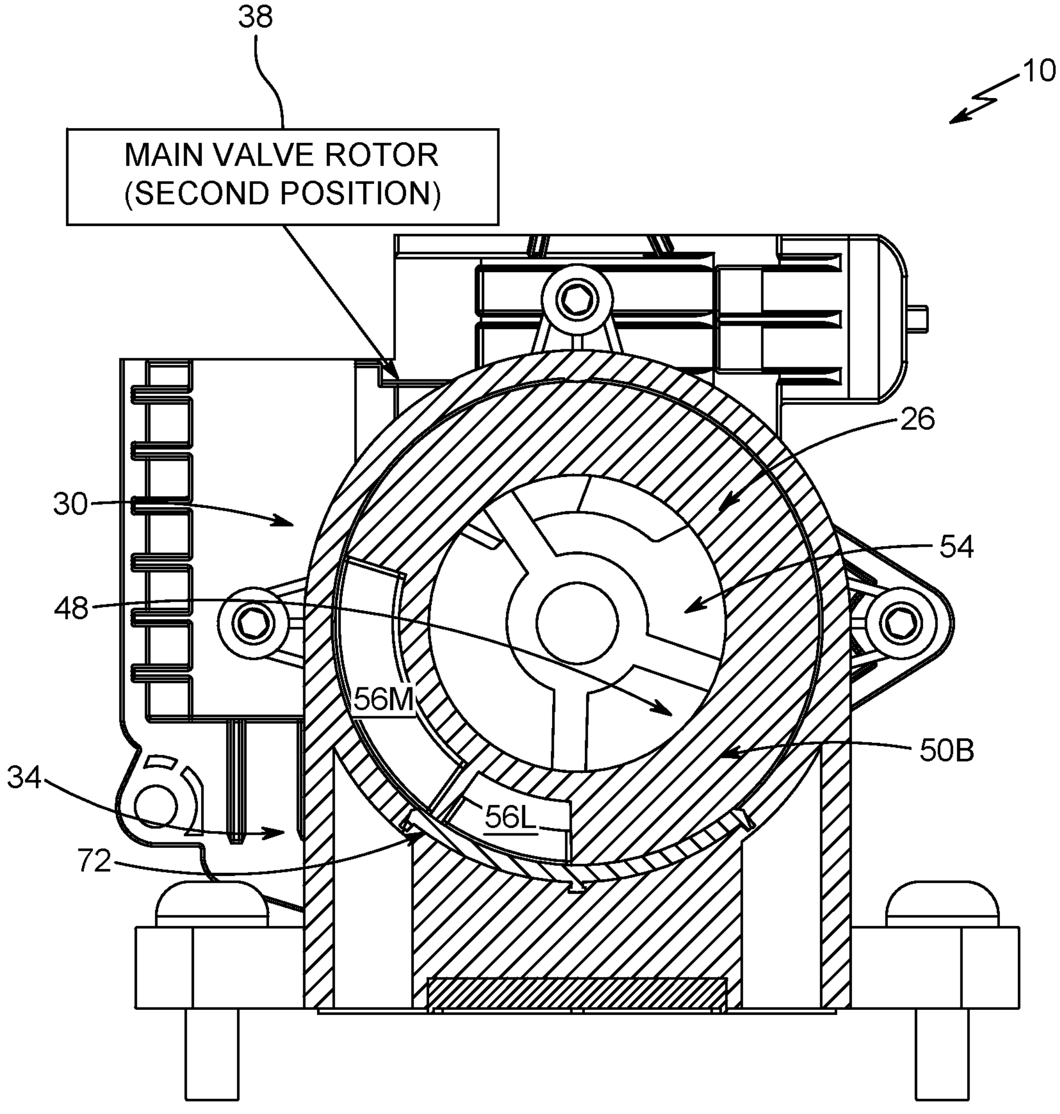
Figure 18C:
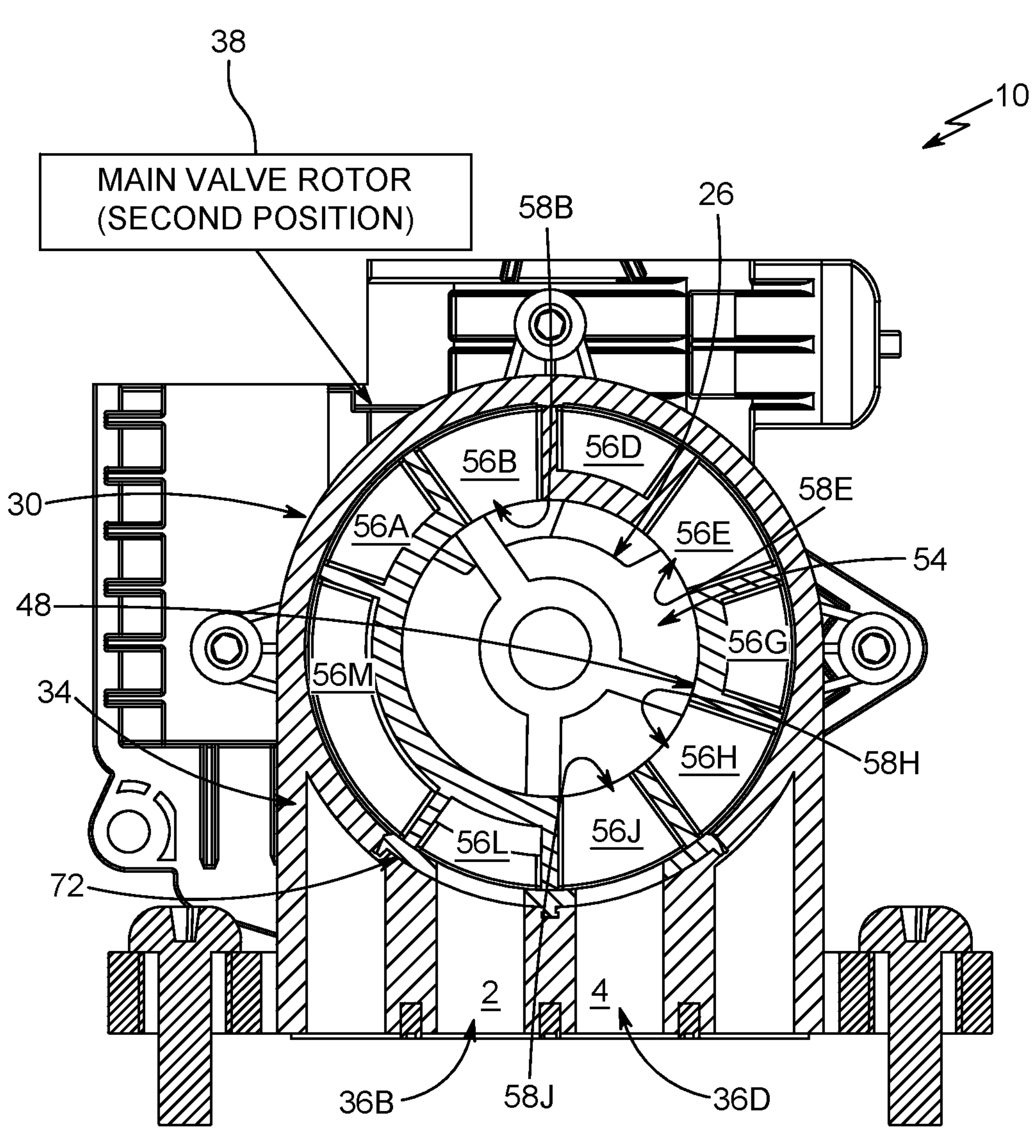
Figure 19:
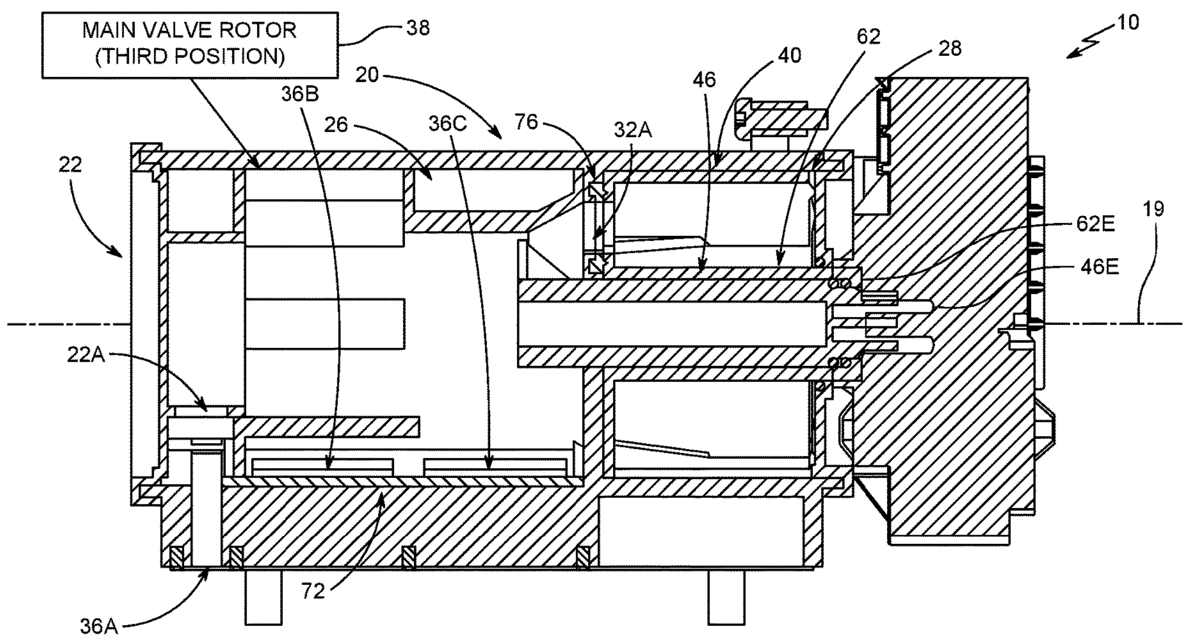
Figure 20A:
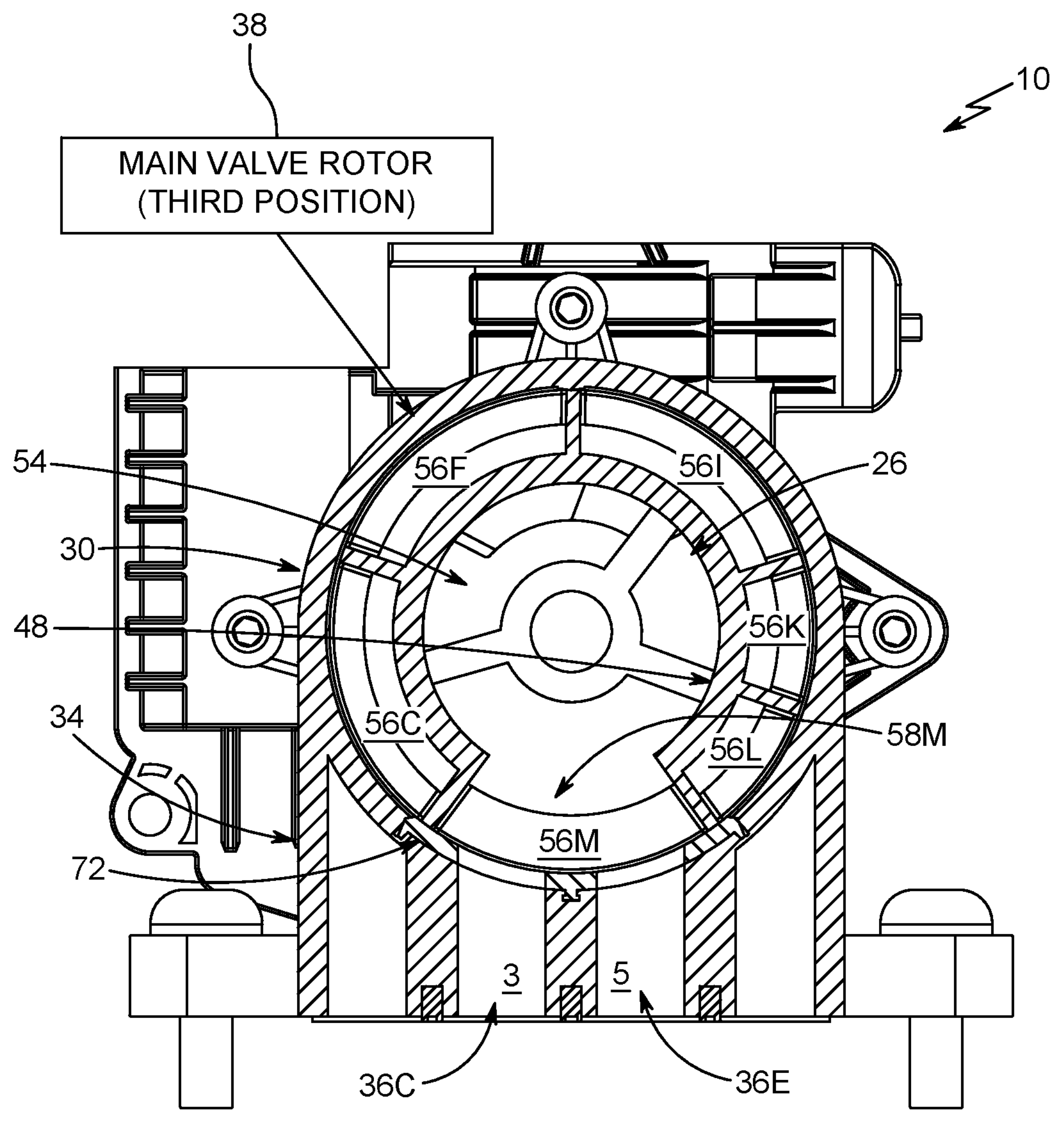
Figure 20B:
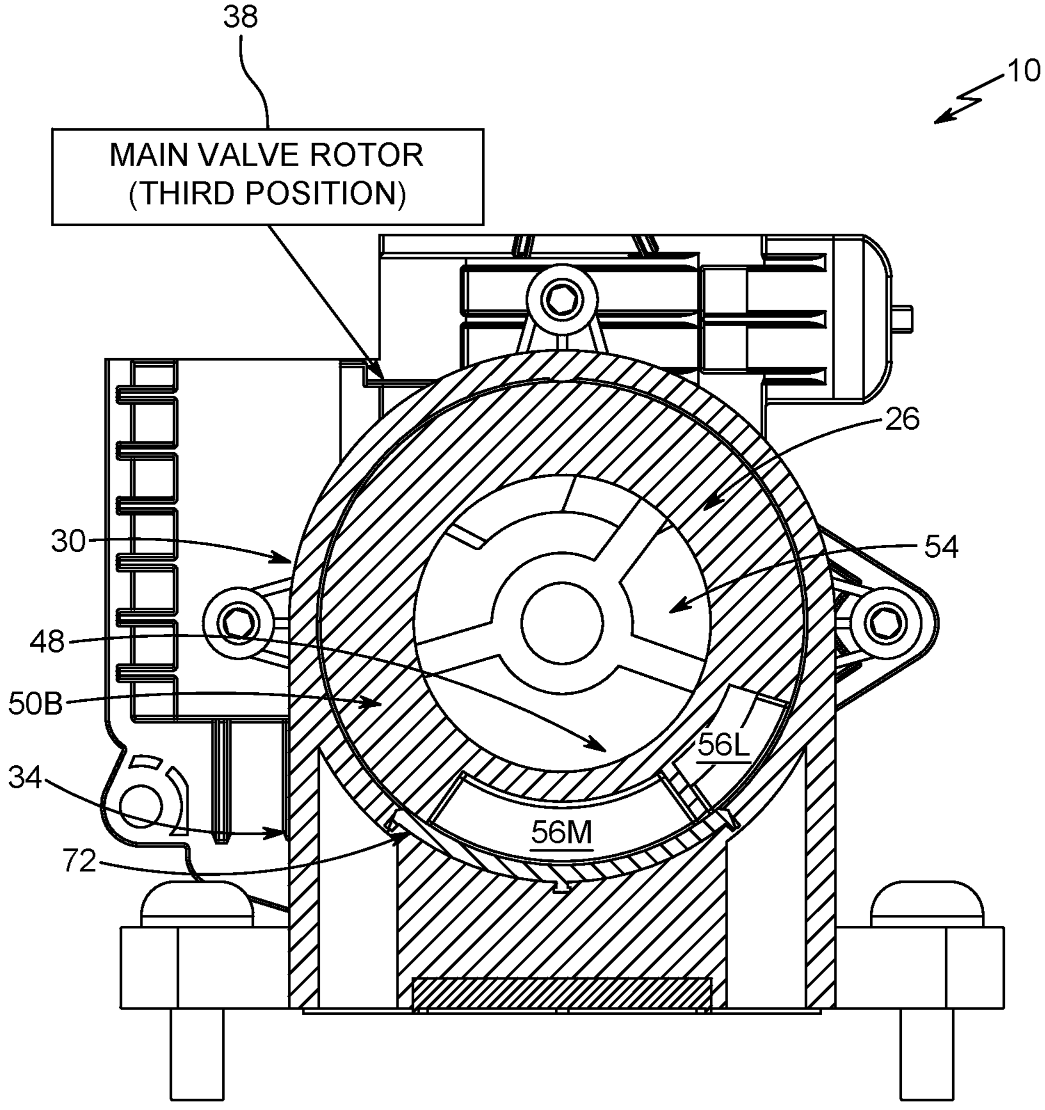
Figure 20C:
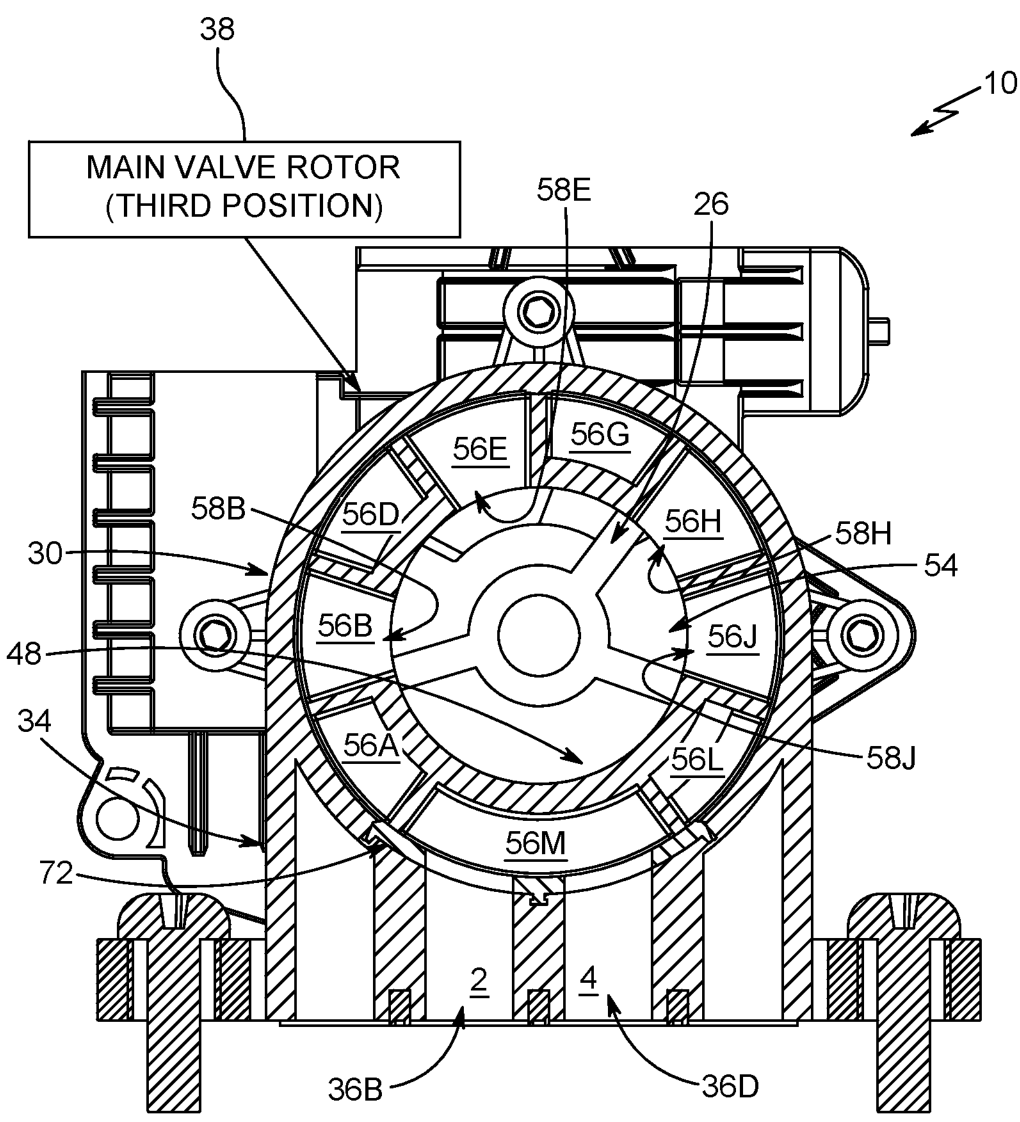
Figure 21:
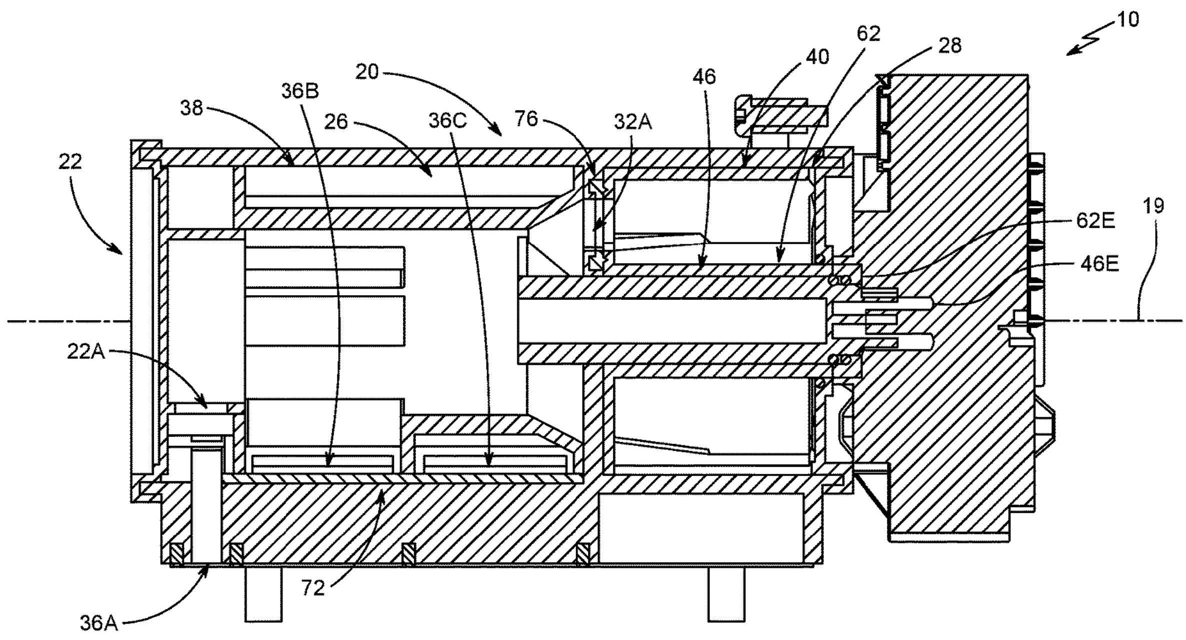
Figure 22A:
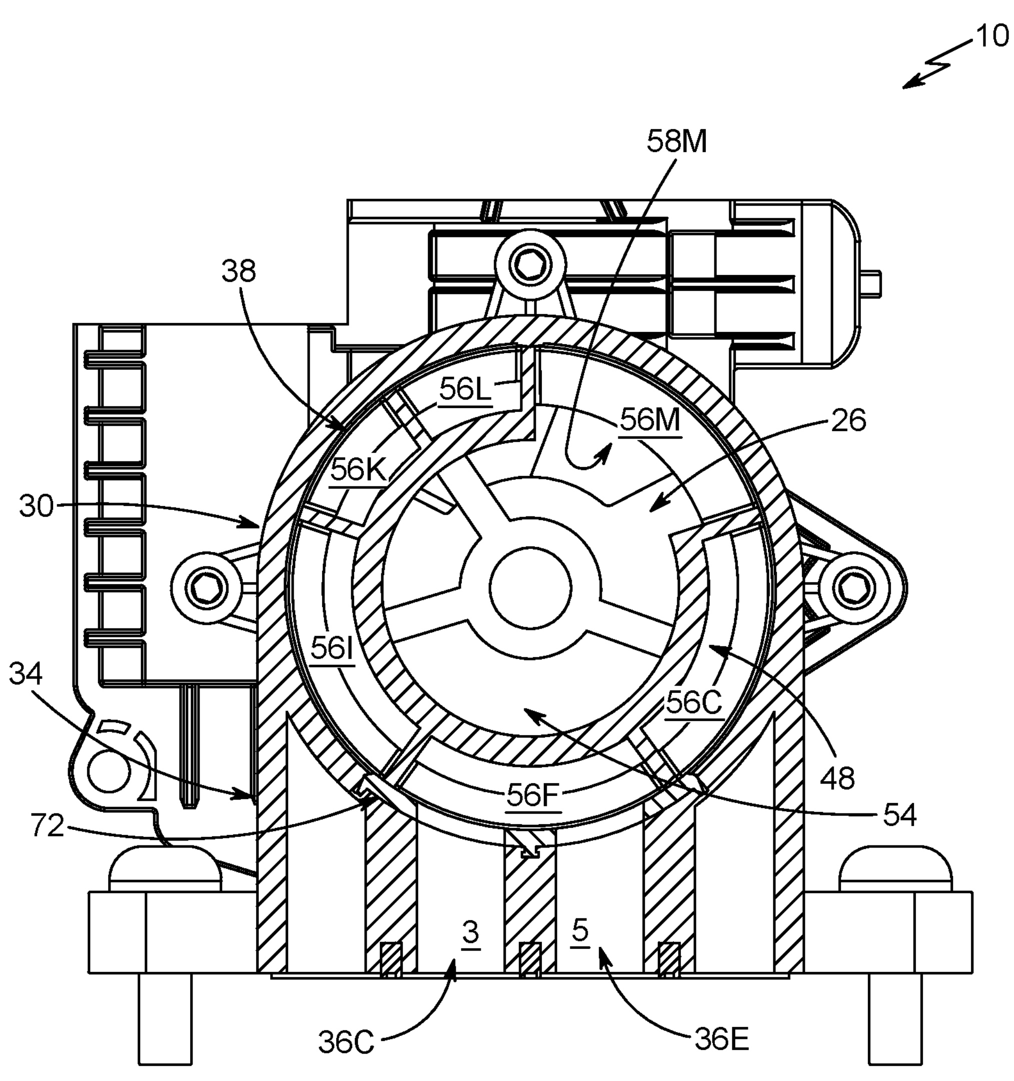
Figure 22B:
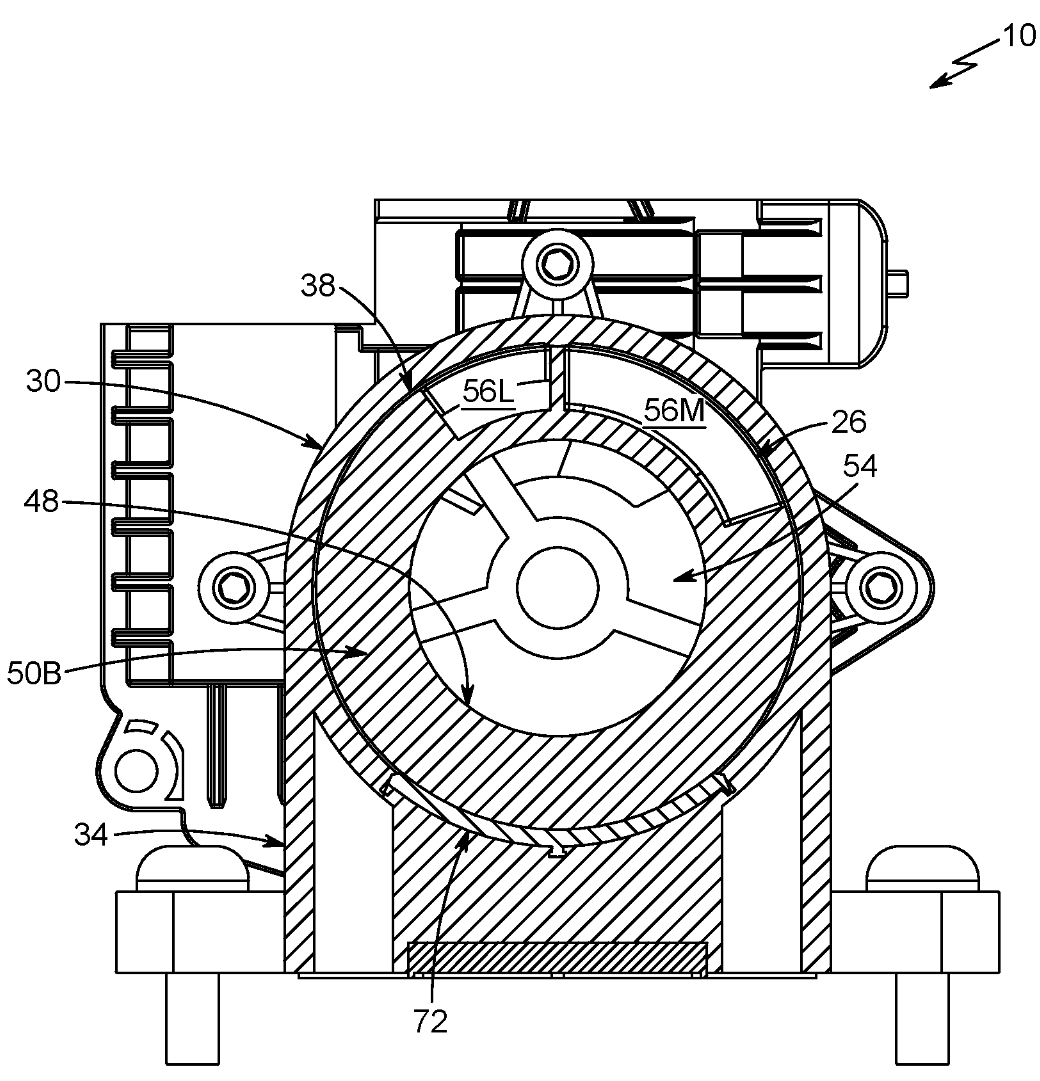
Figure 22C:
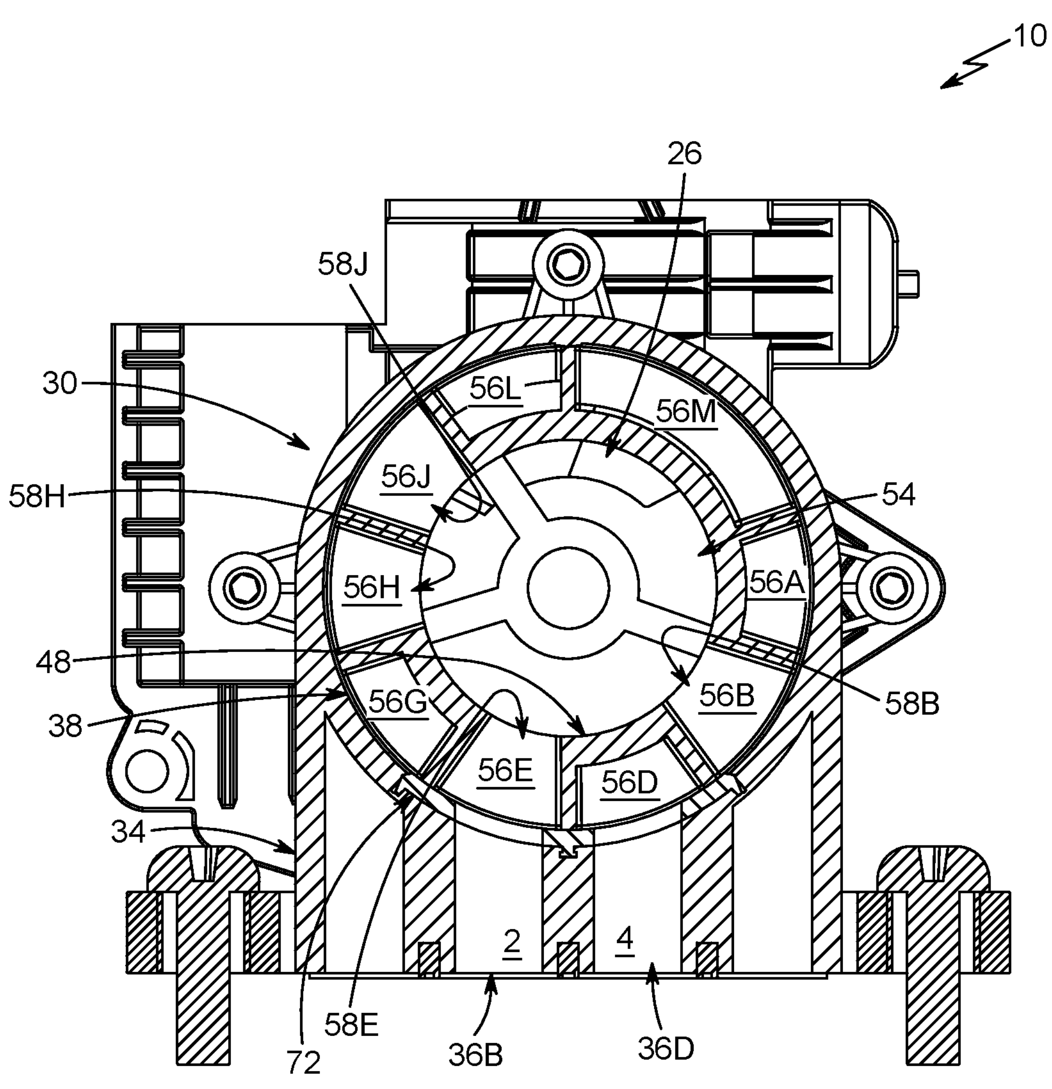
Figure 23:
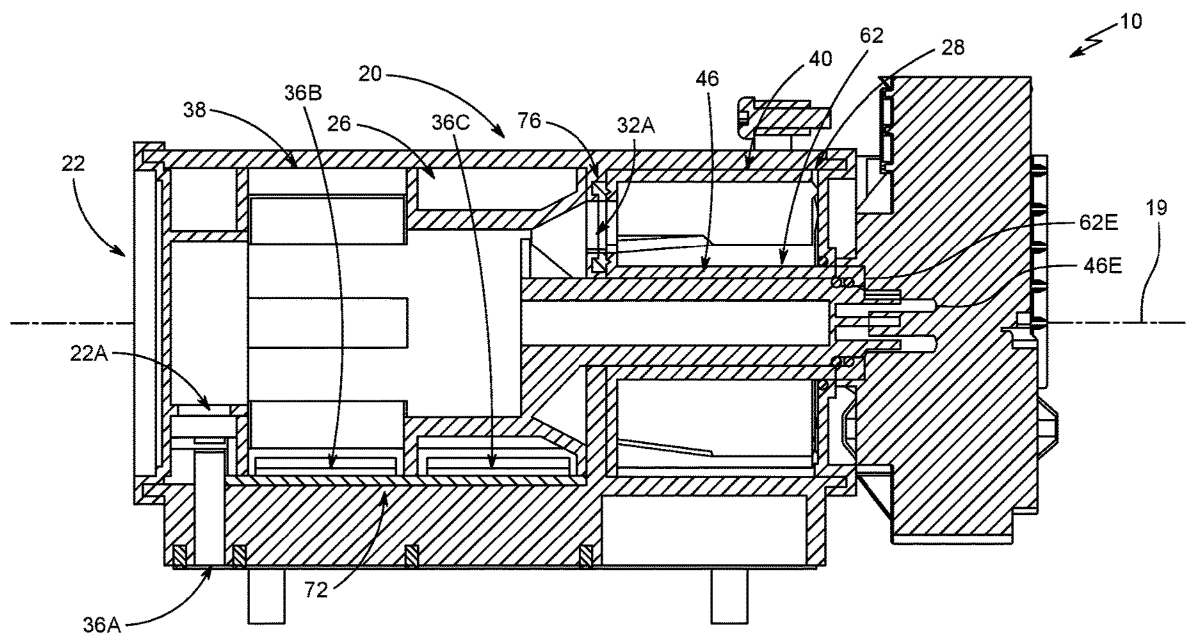
Figure 24A:
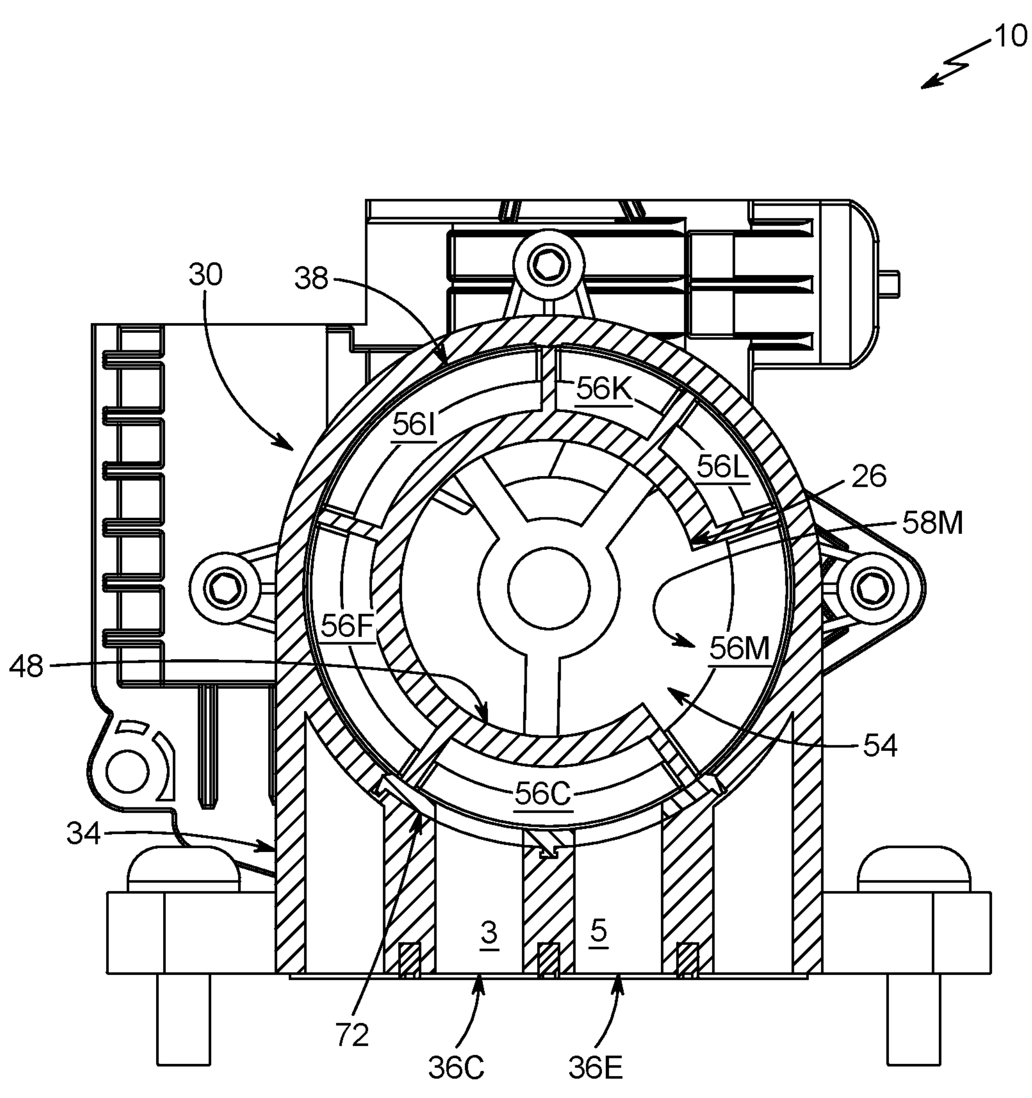
Figure 24B:
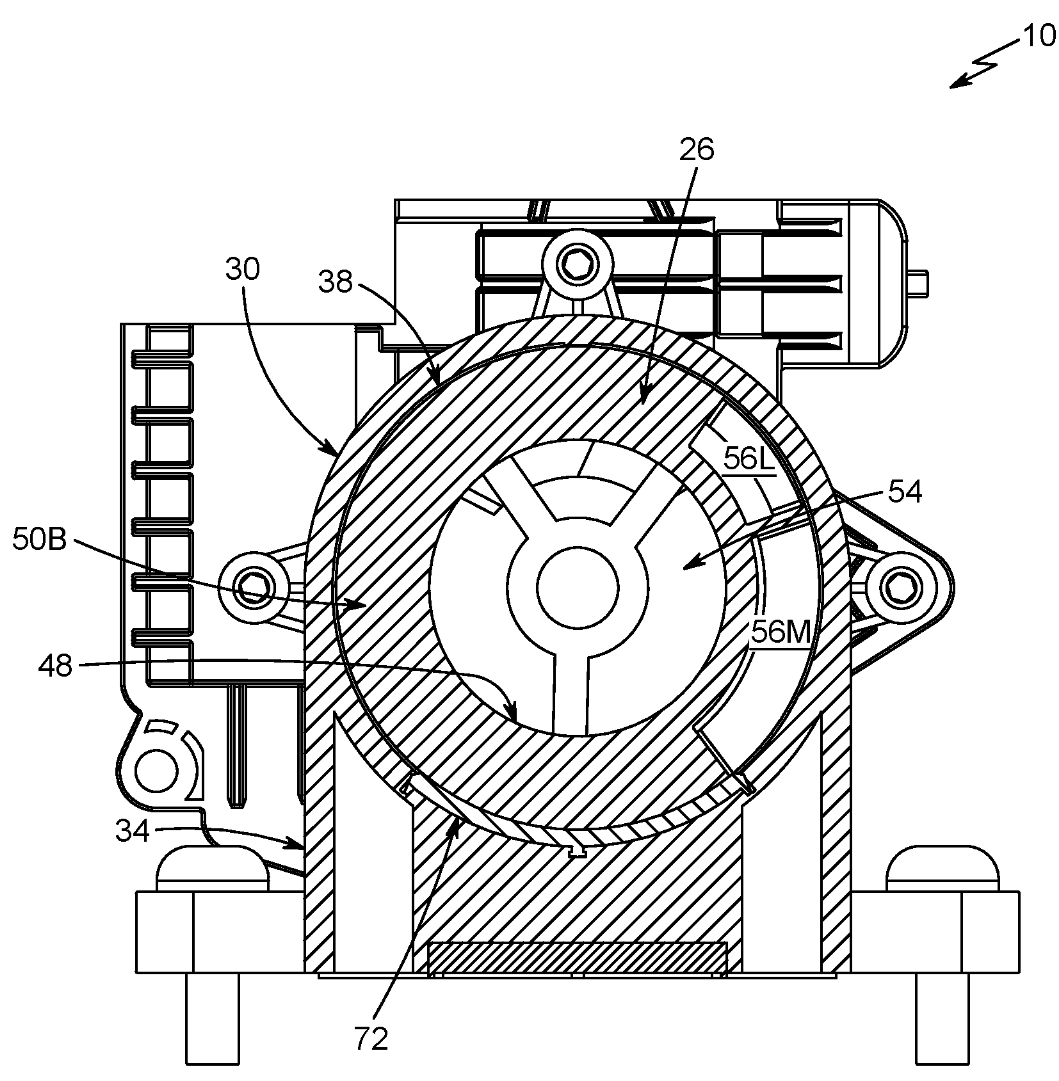
Figure 24C:
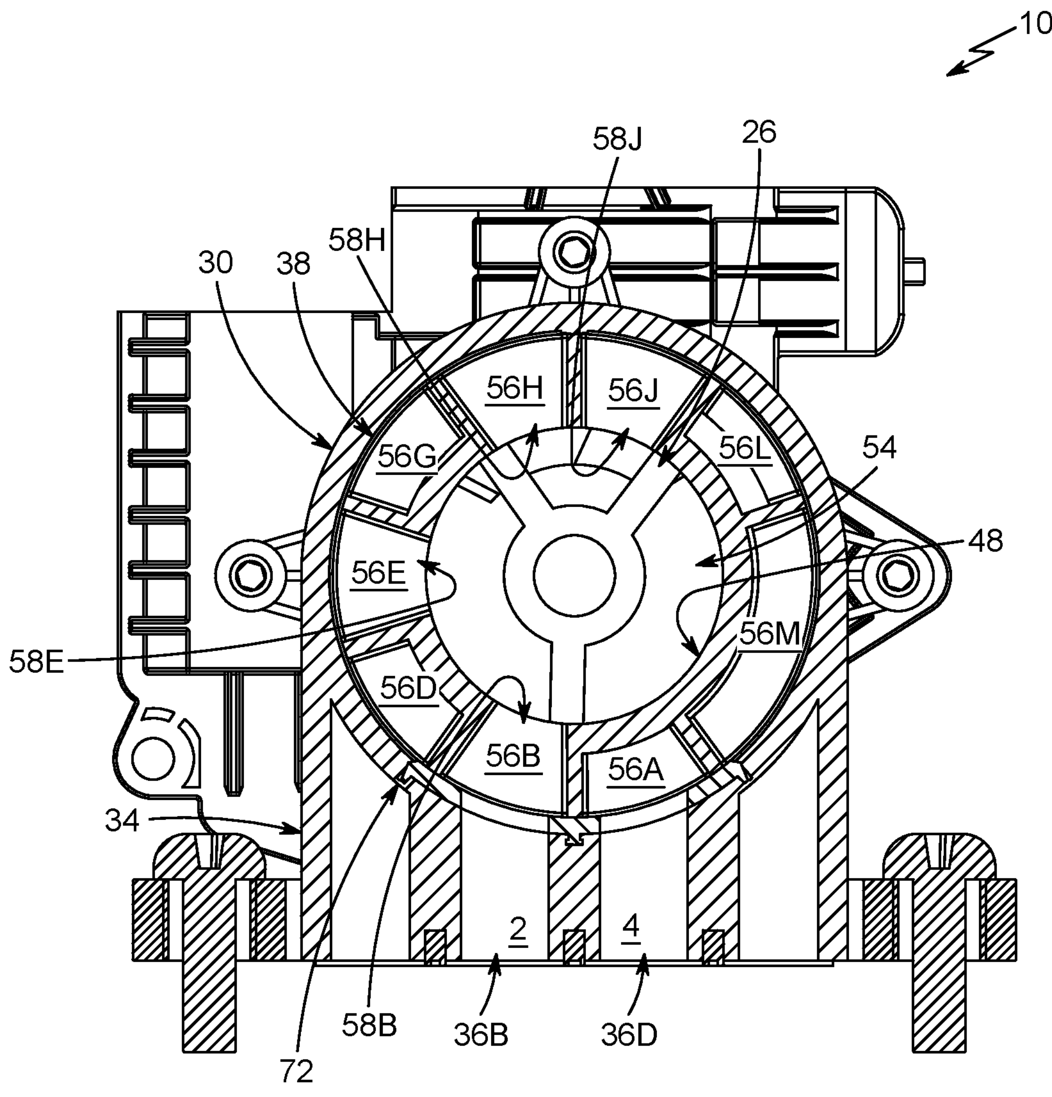
Figures 25, 25A:
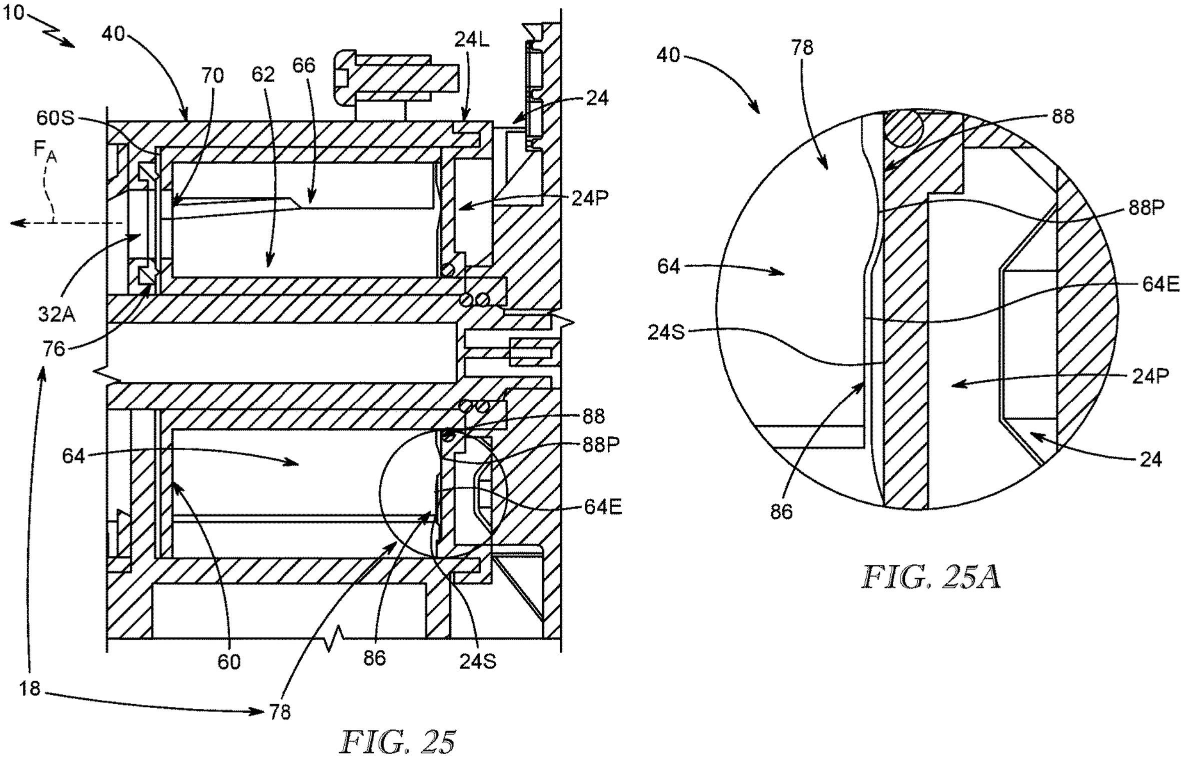
Figures 26, 26A:
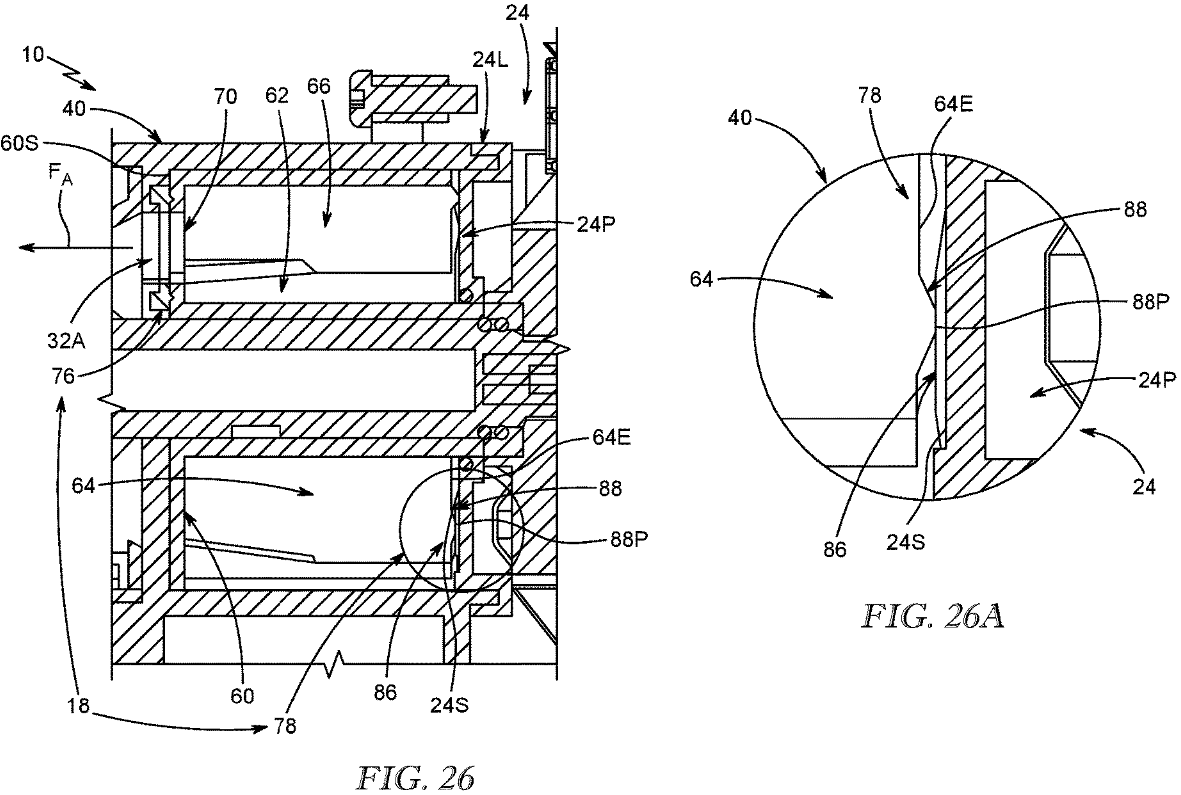
Figures 27, 27A:
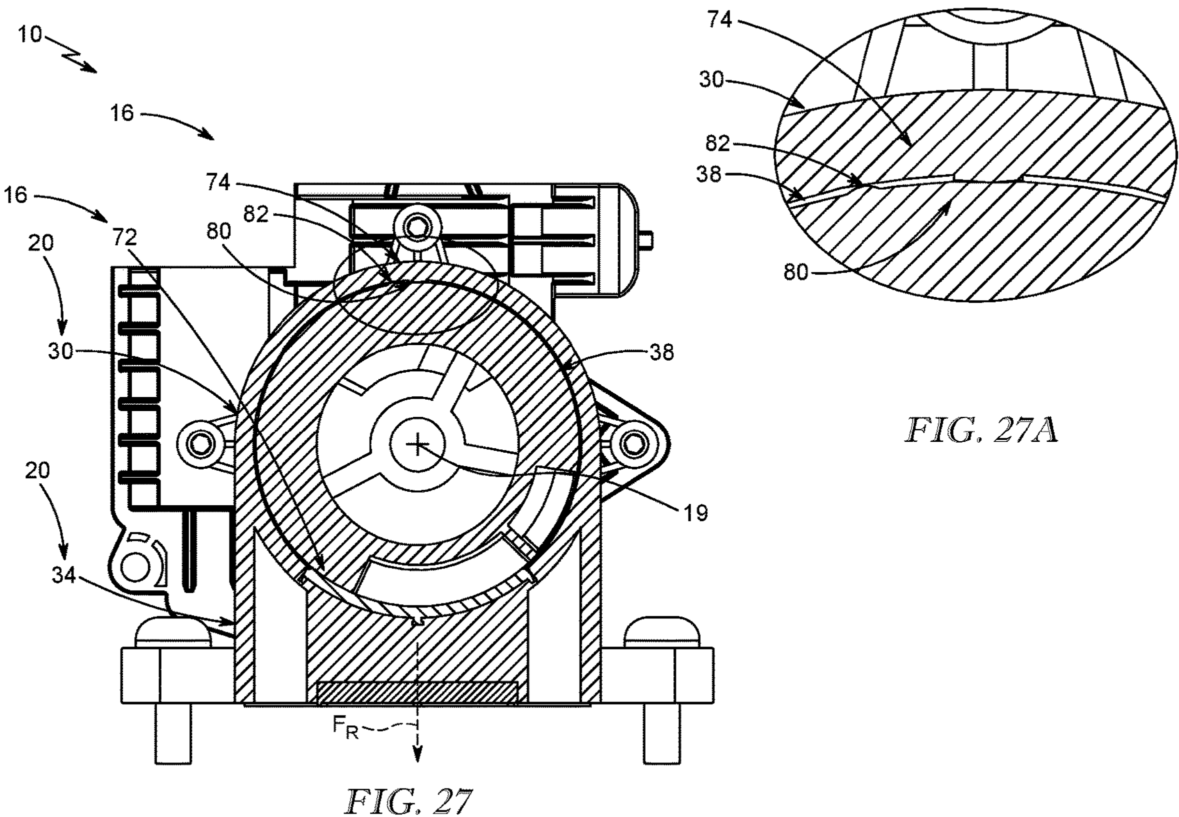
Figures 28, 28A:
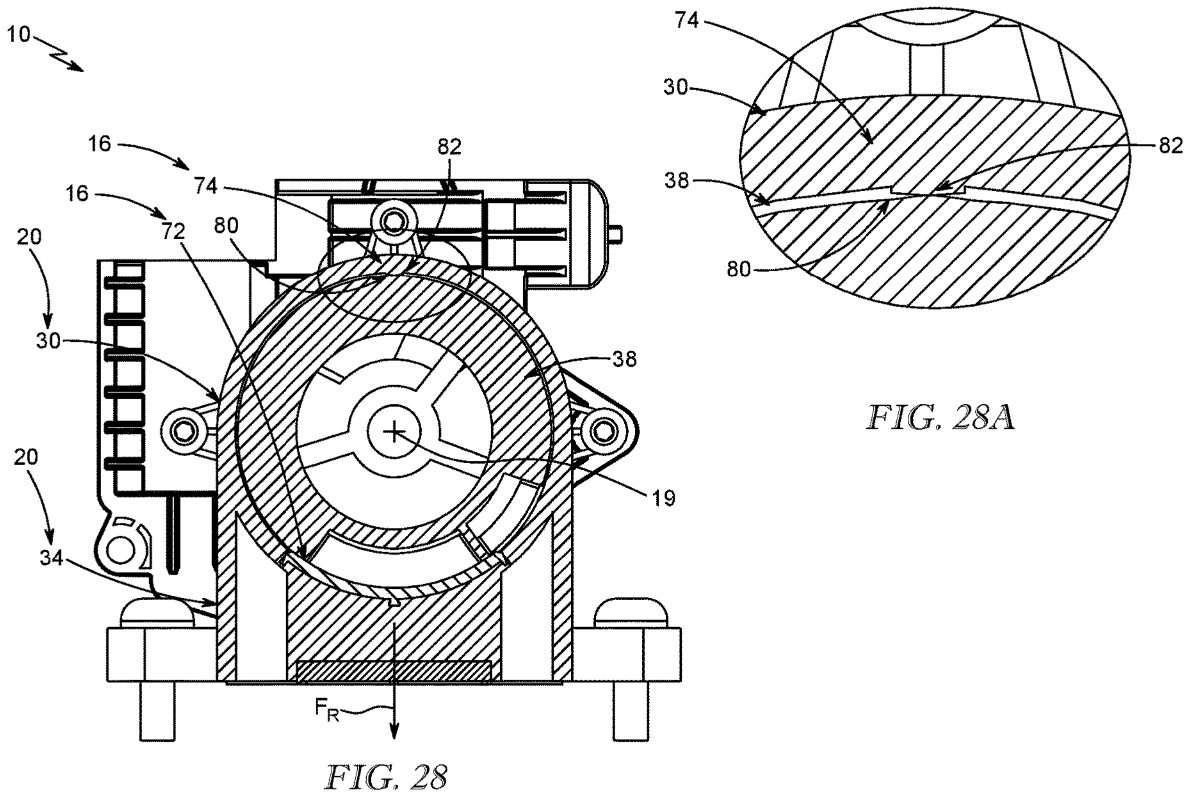

FIG. 7 is a perspective view of the throttle valve rotor and the second end cover included in the multi-way valve of FIG. 2 showing the throttle valve rotor includes a second valve rotor plate formed to include a second rotor through hole that extends axially through the second valve rotor relative to the second rotor axis and a plurality of second valve rotor walls that extend axially away from the second valve rotor plate to define a plurality of second valve ports, and further showing the second sealing system includes cam ramps formed on an axially facing surface of the second housing cover of the valve housing and cam surfaces formed on each of the second valve rotor walls of the second valve rotor that selectively engage the cam ramps on the second housing end cover as suggested in FIGS. 25-26A as the second valve rotor rotates about the valve axis to the different predetermined positions to form a second biasing assembly configured to selectively apply an axial force on the second valve rotor to urge the second valve rotor into engagement with the seal located in the partition wall of the valve housing body when the second valve rotor is in one of the different predetermined positions to improve sealing between the second valve rotor and the first valve rotor;

FIG. 8 is an elevation view of the throttle valve rotor of FIG. 7 showing the cam surfaces included in the second biasing assembly each form a high point that when aligned with the cam ramps on the second housing end cover apply the axis force to the second valve rotor, and further showing each of the cam surfaces is formed on the terminal ends of each second valve rotor wall such that the high point of each cam surface is not equally spaced apart around the valve axis;

FIG. 9 is an elevation view of the second end cover of FIG. 7 showing the camp ramps are equally spaced apart around the valve axis and each of the cam ramps forms a high point that engages with the high point on the cam surfaces to apply the axial force;

FIG. 10 is a table showing the different modes of the multi-way valve of FIG. 1 and the different flow paths created at each of the different modes A-E;

FIG. 10A is a bottom view of the multi-way valve in mode A or mode B1 as shown in FIG. 10 in which the main valve rotor is in a MAIN VALVE ROTOR FIRST position and the throttle valve rotor 40 is in a THROTTLE VALVE ROTOR FIRST position;

FIG. 10B is a bottom view of the multi-way valve in mode B2 or mode C as shown in FIG. 10 in which the main valve rotor stays in the MAIN VALVE ROTOR FIRST position and the throttle valve rotor 40 has rotated to a THROTTLE VALVE ROTOR SECOND position;

FIG. 10C is a top view of the multi-way valve in mode B3 as shown in FIG. 10 in which the main valve rotor stays in the MAIN VALVE ROTOR FIRST position, while the throttle valve rotor has rotated to a THROTTLE configuration;

FIG. 10D is a top view of the multi-way valve in mode D as shown in FIG. 10 in which the throttle valve rotor stays in the THROTTLE VALVE ROTOR FIRST position, while the main valve rotor moves to a MAIN VALVE ROTOR SECOND position;

FIG. 10E is a top view of the multi-way valve in mode E as shown in FIG. 10 in which the main valve rotor moves to a MAIN VALVE ROTOR THIRD position, while the throttle valve rotor 40 is in the THROTTLE configuration;

FIG. 11 is a cross-sectional view of the multi-way valve of FIG. 10A showing the throttle valve rotor 40 is in the THROTTLE VALVE ROTOR FIRST position in which the connecting aperture is blocked by the throttle valve rotor and the sixth aperture and the seventh aperture formed in the valve housing body are in fluid communication with the second valve cavity and with each other;

FIG. 12 is a cross-sectional view of the multi-way valve of FIG. 10B showing the throttle valve rotor 40 is in the THROTTLE VALVE ROTOR SECOND position in which the throttle valve rotor covers the sixth aperture and the hole formed in the throttle valve rotor is aligned with the connecting aperture so that the first valve cavity is in fluid communication with the seventh aperture;

FIG. 13 is a cross-sectional view of the multi-way valve of FIG. 10C showing the throttle valve rotor 40 is in the THROTTLE configuration in which the hole formed in the throttle valve rotor remains aligned with the connecting aperture so that the first valve cavity is in fluid communication with both the sixth aperture and the seventh aperture formed in the valve housing body;

FIG. 14 is a cross-sectional view of the multi-way valve showing the throttle valve rotor 40 may be in a THROTTLE VALVE ROTOR THIRD position in which the connecting aperture is blocked by the throttle valve rotor, the second valve cavity is isolated from the first valve cavity, and the sixth and seventh apertures are covered blocking flow between the sixth and seventh apertures and the second valve cavity;

FIG. 15 is a cross-sectional view of the multi-way valve of FIG. 10A showing the main valve rotor in the MAIN VALVE ROTOR FIRST position in which the main valve rotor connects the first aperture to the second aperture, connects the third aperture and the fifth aperture, and blocks the fourth aperture to form the first flow path, and further showing one of the chambers surrounds the third aperture and the fifth aperture to connect the third and fifth apertures in fluid communication as shown in FIG. 16A, while another one of the chambers surrounds the fourth aperture to block the flow of fluid to the fourth aperture as shown in FIG. 16C;

FIG. 16A is a cross-sectional view of the multi-way valve of FIG. 15 taken at a first axial location along the valve axis showing the main valve rotor in the MAIN VALVE ROTOR FIRST position in which one of the chambers defined by the main valve rotor surrounds the third aperture and the fifth aperture to connect the third and fifth apertures in fluid communication with each other while isolating the third and fifth apertures from the other apertures;

FIG. 16B is a cross-sectional view of the multi-way valve of FIG. 15 taken at a second axial location along the valve axis showing the main valve rotor in the MAIN VALVE ROTOR FIRST position in which one of the flow divider walls blocks flow from the third and fifth apertures to the first, second, and fourth apertures;

FIG. 16C is a cross-sectional view of the multi-way valve of FIG. 15 taken at a third axial location along the valve axis showing the main valve rotor in the MAIN VALVE ROTOR FIRST position in which one of the chambers surrounds the fourth aperture to block the flow of fluid to the fourth aperture and the chamber surrounding the second aperture has an opening so that the second aperture in fluid communication with the first aperture, i.e. the first valve cavity;

FIG. 17 is a cross-sectional view of the multi-way valve of FIG. 10D showing the main valve rotor in the MAIN VALVE ROTOR SECOND position in which the main valve rotor has rotated so that the main valve rotor connects the second aperture and the third aperture, connects the first aperture and the fourth aperture, and blocks the fifth aperture to form another flow path, and further showing one of the chambers surrounds the second and third apertures to connect the second and third apertures in fluid communication as shown in FIGS. 18A-18C, while another one of the chambers surrounds the fifth aperture to block the flow of fluid to the fifth aperture as shown in FIG. 18C;

FIG. 18A is a cross-sectional view of the multi-way valve of FIG. 17 taken at the first axial location along the valve axis showing the main valve rotor in the MAIN VALVE ROTOR SECOND position in which the third and fifth apertures are surrounded by different chambers so that the flow of fluid is blocked from the fifth aperture;

FIG. 18B is a cross-sectional view of the multi-way valve of FIG. 17 taken at the second axial location along the valve axis showing the main valve rotor in the MAIN VALVE ROTOR SECOND position in which the chamber surrounding the third aperture extends axially so that the second and third apertures are connected in fluid communication;

FIG. 18C is a cross-sectional view of the multi-way valve of FIG. 17 taken at the third axial location along the valve axis showing the main valve rotor in the MAIN VALVE ROTOR SECOND position in which the same chamber surrounding the third aperture surround the second aperture and the chamber surrounding the fourth aperture has an opening so that the fourth aperture in fluid communication with the first aperture, i.e. the first valve cavity;

FIG. 19 is a cross-sectional view of the multi-way valve of FIG. 10E showing the main valve rotor in the MAIN VALVE ROTOR THIRD position in which the main valve rotor has rotated so that the main valve rotor connects all the apertures in fluid communication, further showing the chamber that surround the second aperture, the third aperture, the fourth aperture, and the fifth aperture and has an opening so that the apertures are in fluid communication with the first aperture as shown in FIGS. 20A-20C;

FIG. 20A is a cross-sectional view of the multi-way valve of FIG. 19 taken at the first axial location along the valve axis showing the main valve rotor in the MAIN VALVE ROTOR THIRD position in which the chamber surrounds both the third and fifth apertures has an opening so that the apertures are in fluid communication with the first aperture;

FIG. 20B is a cross-sectional view of the multi-way valve of FIG. 19 taken at the second axial location along the valve axis showing the main valve rotor in the MAIN VALVE ROTOR location position in which the chamber extends axially so that the third and fifth apertures and connected in fluid communication with the second and fourth apertures;

FIG. 20C is a cross-sectional view of the multi-way valve of FIG. 19 taken at the third axial location along the valve axis showing the main valve rotor in the MAIN VALVE ROTOR location position in which the same chamber surrounding the third and fifth apertures extends to the second and fourth apertures;

FIG. 21 is a cross-sectional view of the multi-way valve in another possible position similar to the MAIN VALVE ROTOR FIRST position;

FIG. 22A is a cross-sectional view of the multi-way valve of FIG. 21 taken at the first axial location along the valve axis;

FIG. 22B is a cross-sectional view of the multi-way valve of FIG. 21 taken at the second axial location along the valve axis;

FIG. 22C is a cross-sectional view of the multi-way valve of FIG. 21 taken at the third axial location along the valve axis;

FIG. 23 is a cross-sectional view of the multi-way valve in another possible position similar to the MAIN VALVE ROTOR FIRST position;

FIG. 24A is a cross-sectional view of the multi-way valve of FIG. 23 taken at the first axial location along the valve axis;

FIG. 24B is a cross-sectional view of the multi-way valve of FIG. 23 taken at the second axial location along the valve axis;

FIG. 24C is a cross-sectional view of the multi-way valve of FIG. 23 taken at the third axial location along the valve axis;

FIG. 25 is a cross-sectional view of a portion of the multi-way valve of FIG. 1 showing the second biasing assembly has not yet applied the axial force to the throttle valve rotor;

FIG. 25A is a detail view of FIG. 25 showing one of the cam surfaces on the throttle valve rotor is spaced apart from the corresponding cam ramp so that the axial force is not applied to the throttle valve rotor by the second biasing assembly to reduce friction on the throttle valve rotor;

FIG. 26 is a cross-sectional view similar to FIG. 25 showing the throttle valve rotor has rotated about the valve axis to one of the predetermined positions to cause the second biasing assembly to apply the axial force to the throttle valve rotor to urge the throttle valve rotor axially toward the partition wall of the valve housing and into engagement with the second seal to increase friction therebetween;

FIG. 26A is a detail view of FIG. 26 showing the cam surface on the throttle valve rotor is aligned with the corresponding cam ramp so that the axial force is applied to the throttle valve rotor by the second biasing assembly to increase friction on the throttle valve rotor and improve sealing;

FIG. 27 is a cross-sectional view of the multi-way valve of FIG. 1 showing the first biasing assembly has not yet applied the radial force to the main valve rotor;

FIG. 27A is a detail view of FIG. 27 showing one of the protrusions formed on the main valve rotor is spaced apart from the ridge formed on the valve housing body so that the radial force is not applied to the main valve rotor by the first biasing assembly to reduce friction on the main valve rotor;

FIG. 28 is a cross-sectional view similar to FIG. 27 showing the main valve rotor has rotated about the valve axis to one of the predetermined positions to cause the first biasing assembly to apply the radial force to the main valve rotor to urge the main valve rotor radially outward toward the valve housing body and into engagement with the first seal to increase friction therebetween; and FIG. 28A is a detail view of FIG. 28 showing the protrusion on the main valve rotor is aligned with the ridge formed on the valve housing body so that the radial force is applied to the main valve rotor by the first biasing assembly to increase friction on the main valve rotor and improve sealing.

DETAILED DESCRIPTION

Figure 3:
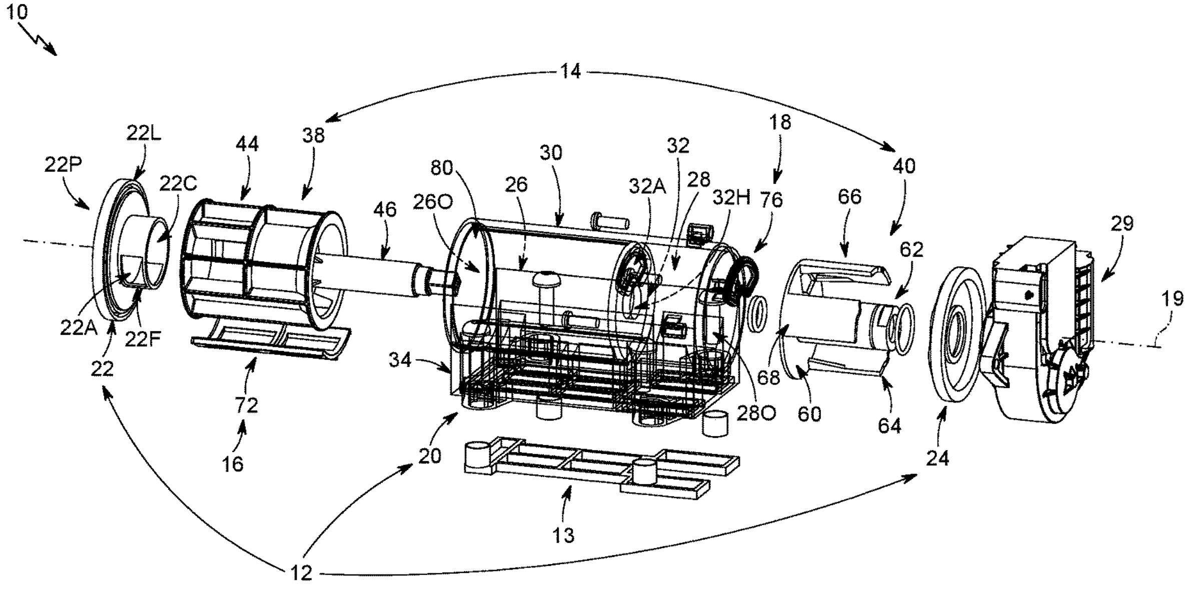

An illustrative multi-way valve 10 configured to control the flow of fluid to various thermal fluid circuits in a vehicle is shown in FIG. 1. The multi-way valve 10 includes a valve housing 12, a valve flow controller 14, a first sealing system 16, and a second sealing system 18 as shown in FIGS. 2 and 3. The valve flow controller 14 is arranged in the valve housing 12 to control flow through the valve housing 12. The sealing system 16 is configured to seal between the valve housing 12 and the valve flow controller 14.

The valve flow controller 14 includes a first valve rotor 38 arranged in a first valve cavity 26 formed by the valve housing 12, a second valve rotor 40 arranged in a second valve cavity 28 formed by the valve housing 12, and actuators 29 as shown in FIGS. 2 and 3. The first valve rotor 38 and the second valve rotor 40 are both configured to rotate relative to the valve housing 12 about a valve axis 19. Each actuator 29 is coupled to one of the valve rotors 38, 40 to drive rotation of the corresponding valve rotor 38, 40.

The first and second valve rotors 38, 40 cooperate to define a plurality of flow paths through the valve housing 12 as shown in FIGS. 10A-10E. As the first and second valve rotors 38, 40 are rotated about the valve axis 19 to different set positions as shown in FIGS. 11-24C, the first and second valve rotors 38, 40 form the different flow paths to control a flow of fluid through the valve housing 12 to different thermal fluid circuits.

The different modes of the multi-way valve 10 are shown in FIG. 10. The first and second valve rotors 38, 40 are in different predetermined positions in each of the different modes A-E to form the different flow paths through the valve housing 12. The multi-way valve 10 and/or each of the actuators 29 may include a control unit that is preprogrammed with the different modes A-E.

By axially stacking the first valve rotor 38 and the second valve rotor 40, the overall size of the multi-way valve 10 is reduced compared to other multi-way valves. Moreover, the stacked arrangement of the first and second valve rotors 38, 40 allows the use of a single nested actuator 29.

Other multi-way valves may have more complex passageways through the valve housing, which complicates sealing and increases the pressure drop as the fluid has to make more turns/changes direction more. The complex passageways may increase the potential for leaks across the different passageways. These valves may incorporate seals to seal between the passageways, but adding seals may require the actuator to have an increased torque capability to overcome the friction of the seals between the different components.

Moreover, adding more seals increases the overall manufacturing cost of the multi-way valve. Some valves may use a Teflon material for the seals. This may make manufacturing a multi-way valve expensive, especially as other valves have complex passageways with large, complex seals that may need large amounts of Teflon material.

The multi-way valve 10 of the present disclosure includes the first valve rotor 38 axially stacked with the second valve rotor 40 to reduce the amount of sealing material and improve sealing. Additionally, the arrangement of the first valve rotor 38 and the second valve rotor 40 reduces the contract surface area of the seals 72, 76, thereby reducing the friction on the first valve rotor 38 and the second valve rotor 40.

Figure 4:
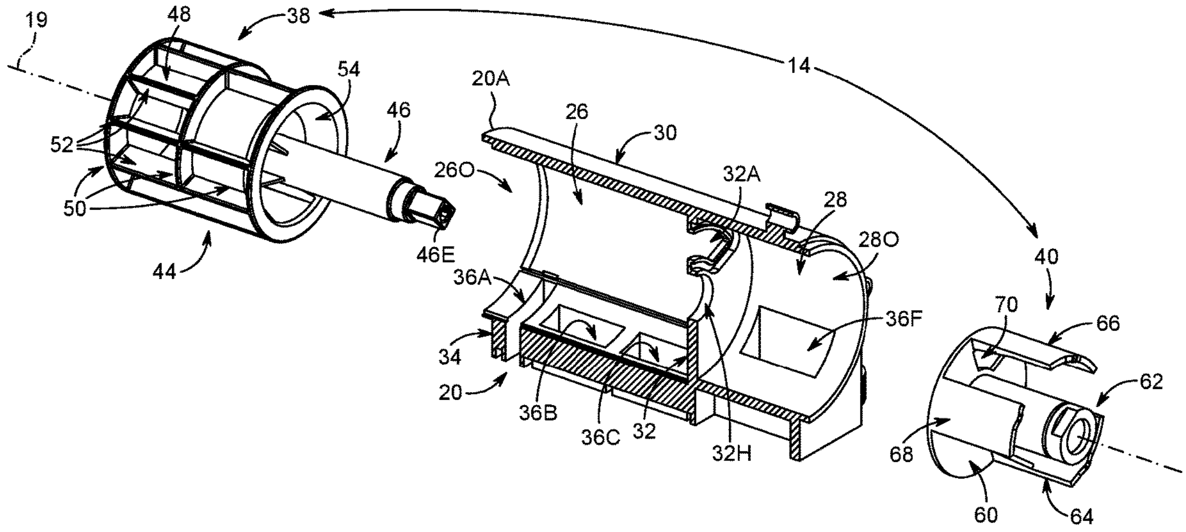

Turning again to the valve housing 12, the valve housing includes a valve housing body 20, a first housing end cover 22, and a second housing end cover 24 as shown in FIGS. 2-4. The valve housing body 20 is formed to include the first valve cavity 26, the second valve cavity 28 in fluid communication with the first valve cavity 26, and a plurality of apertures 36A-G that open into the first and second valve cavities 26, 28. The first housing end cover 22 is coupled to a first end 20A of the valve housing body 20 to close a first end opening 260 to the first valve cavity 26. The second housing end cover 28 is coupled to a second end 20B of the valve housing body 20 to close a second end opening 28O to the second valve cavity 28. The second end 20B is spaced apart axially from the first end 20A of the valve housing body 20 relative to the valve axis 19.

The valve housing body 20 includes an annular outer wall 30, a partition wall 32, and a housing base 34 as shown in Figs. FIGS. 2-4. The annular outer wall 30 extends around the valve axis 19 to define a hollow space. The partition wall 32 is located in the hollow space of the annular outer wall 30 to divide the hollow space into the first valve cavity 26 and the second valve cavity 28. The housing base 34 extends away from the outer wall 30 and is formed to define the plurality of apertures 36A-G that open in the first and second valve cavities 26, 28.

The partition wall 32 is formed to include a connecting aperture 32A as shown in FIGS. 3 and 4. The connecting aperture 32A extends axially through the partition wall 32 so that the first valve cavity 26 is in fluid communication with the second valve cavity 28 through the connecting aperture 32A. The connecting aperture 32A extends circumferentially partway about the valve axis 19.

In the illustrative embodiment, the partition wall 32 is also formed to include a through hole 32H configured to receive a portion of the first valve rotor 38 as shown in FIGS. 3 and 4. The connecting aperture 32A is located radially outward of the through hole 32H.

The plurality of housing apertures 36A-G includes a first aperture 36A, a second aperture 36B, a third aperture 36C, a fourth aperture 36D, a fifth aperture 36E, a sixth aperture 36F, and a seventh aperture 36G as shown in FIGS. 10A-E. The first aperture 36A, the second aperture 36B, the third aperture 36C, the fourth aperture 36D, and the fifth aperture 36E open into the first valve cavity 26. The sixth aperture 36F and the seventh aperture 36G open into the second valve cavity 28.

In the illustrative embodiment, a first seal 72 included in the first sealing system 16 is located radially between the first valve rotor and the annular outer wall 30 of the valve housing body 20 as shown in FIGS. 15-24C. The first seal 72 extends around the second aperture 36B, the third aperture 36C, the fourth aperture 36D, and the first aperture 36E. A second seal 76 included in the second sealing system 18 is located in the connecting aperture 32A.

In the illustrative embodiment, the second seal 72 is a wraparound type seal. In the illustrative embodiment, the second seal 76 is press-fit seal. In some embodiments, the seals 72, 76 may be over molded. In some embodiments, the seals 72, 76 may be o-rings. In other embodiments, the seals 72, 76 may be any other suitable seal.

The first housing end cover 22 includes a cover plate 22P that extends circumferentially around the valve axis 19 and an annular flange 22F that extends axially from the cover plate 22P as shown in FIG. 3. The cover plate 22P couples to the first end 20A of the valve housing body 20. In the illustrative embodiment, an outer edge of the cover plate 22P forms a lip 22L that extends around the first end 20A of the valve housing body 20 to couple the first housing end cover 22 to the valve housing body 20. The annular flange 22F extends circumferentially around the valve axis 19 and extends axially away from the cover plate 22P into the first valve cavity 26.

The annular flange 22F engages the first valve rotor 38 as shown in FIG. 15. In the illustrative embodiment, the flange 22F is formed to include an aperture 22A. The aperture 22A extends through the flange 22F and opens into a cavity 22C formed by the annular flange 22F.

The second housing end cover 24 includes a cover plate 24P that extends circumferentially around the valve axis 19 as shown in FIGS. 3 and 4. The cover plate 24P couples to the second end 20B of the valve housing body 20. In the illustrative embodiment, an outer edge of the cover plate 24P forms a lip 24L that extends around the second end 20B of the valve housing body 20 to couple the second housing end cover 24 to the valve housing body 20. The cover plate 24P is also formed to include a hole 24H that extends axially therethrough and receives portions of the first and second valve rotors 38, 40.

The valve flow controller 14 includes the first valve rotor 38, also referred to as the main valve rotor 38, and the second valve rotor 40, also referred to as the throttle valve rotor 40. The main valve rotor 38 is arranged in the first valve cavity 26 of the valve housing body 20 and the throttle valve rotor 40 is arranged in the second valve cavity 28 of the valve housing body 20. The main valve rotor 38 and the throttle valve rotor 40 are configured to rotate relative to the valve housing body 20 about the valve axis 19.

The first and second valve rotors 38, 40 cooperate to define a plurality of flow paths through the valve housing body 20. As the first and second valve rotors 38, 40 are rotated about the valve axis 19 to different set positions, the first and second valve rotors 38, 40 form different flow paths to control the flow of fluid through the housing apertures 36A-G of the valve housing body 20.

Figures 5, 5A:
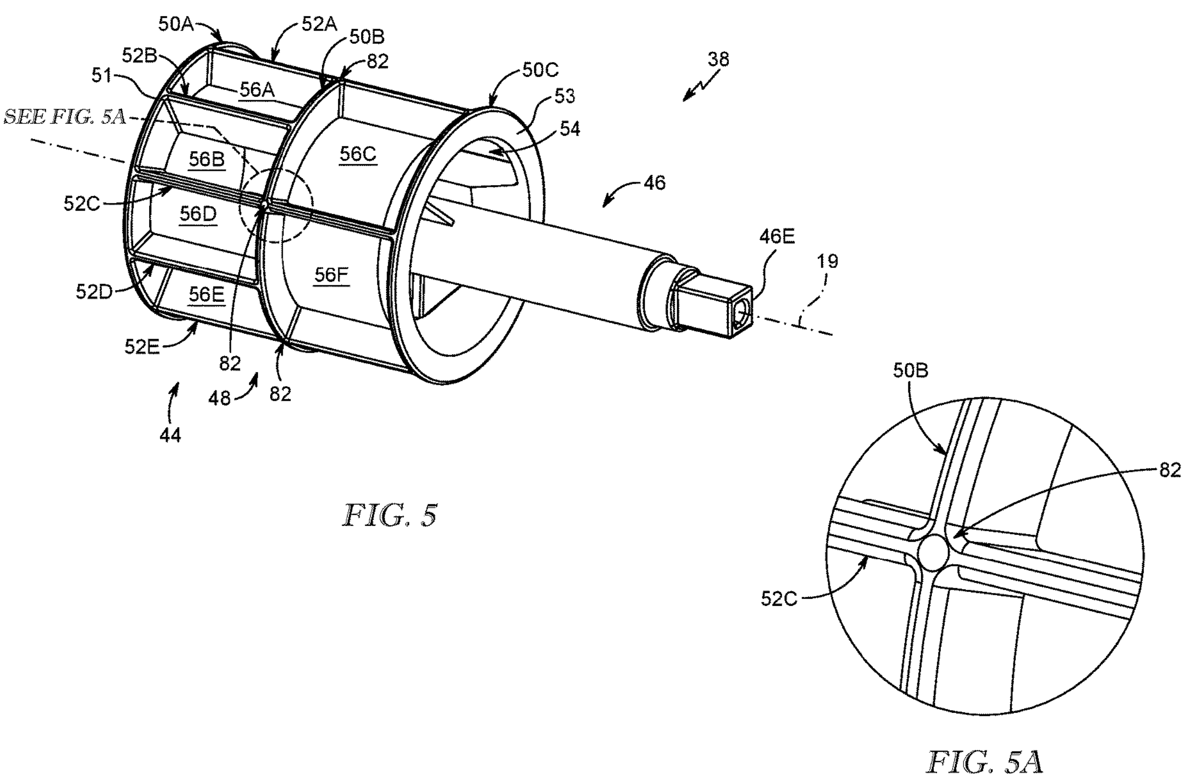
Figure 6A:
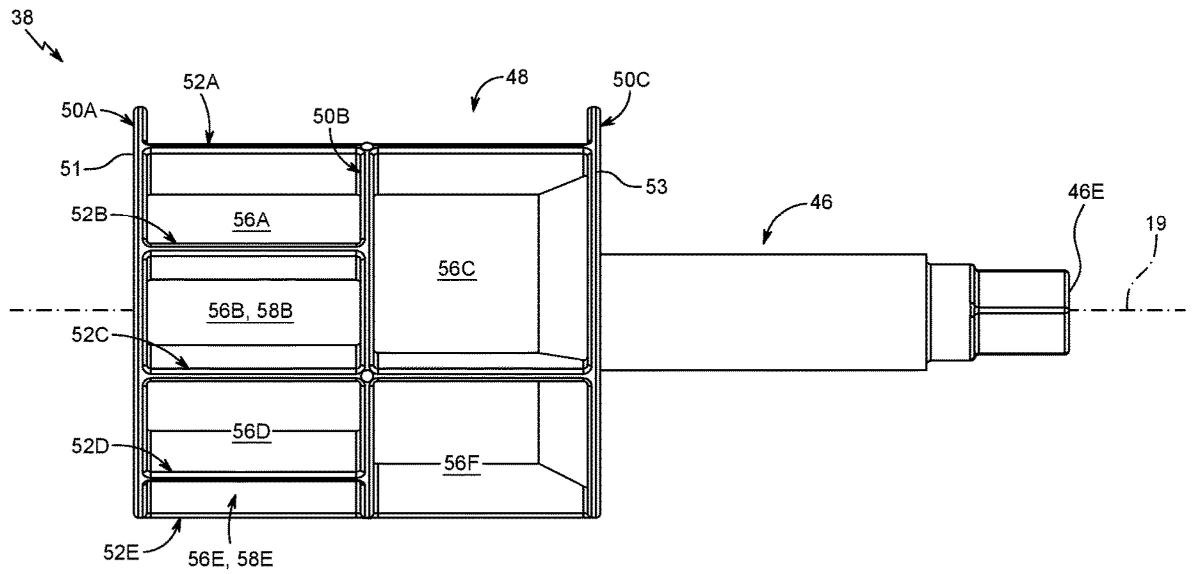
FIG. 6A is an elevation view of the main valve rotor of FIG. 5 showing the different chambers defined by the different circumferential and axial flow divider walls that extends radially outward away from the first valve rotor drum.
Figure 6B:
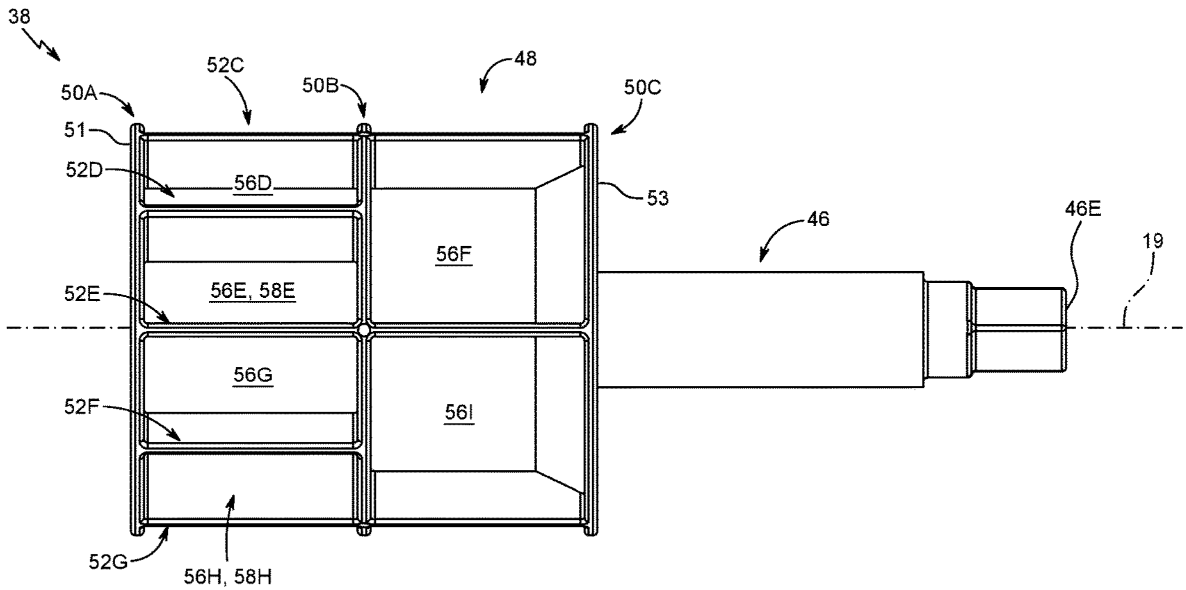
FIG. 6B is an elevation view of the main valve rotor in FIG. 6A rotated 90 degrees about the valve axis compared to FIG. 6A to show the different chambers defined by the different circumferential and axial flow divider walls that extends radially outward away from the first valve rotor drum.
Figure 6C:
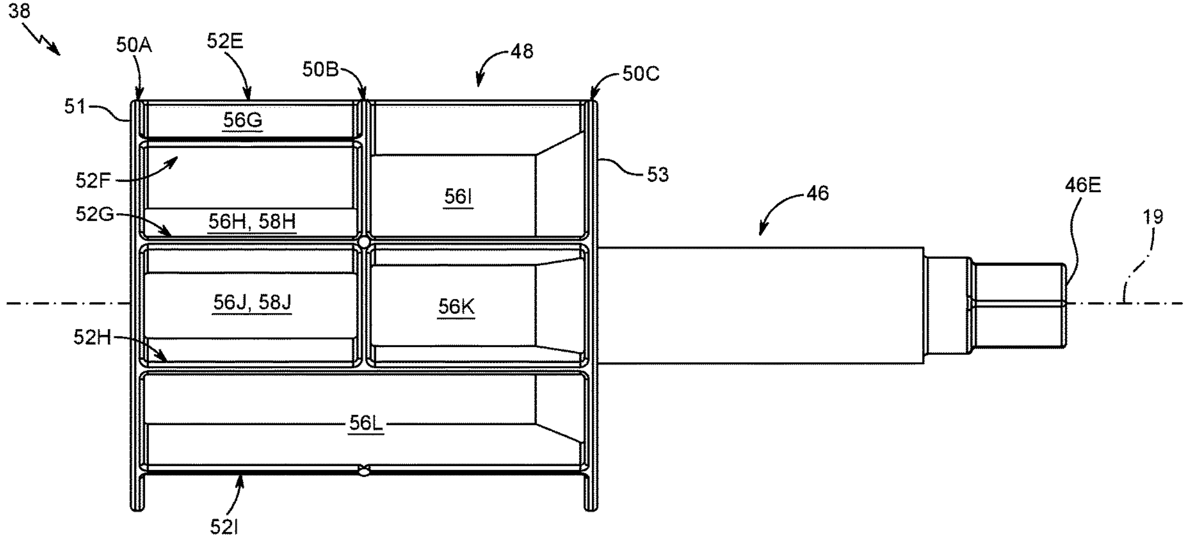
FIG. 6C is an elevation view of the main valve rotor in FIG. 6B rotated 90 degrees about the valve axis compared to FIG. 6B to show the different chambers defined by the different circumferential and axial flow divider walls that extends radially outward away from the first valve rotor drum.
Figure 6D:
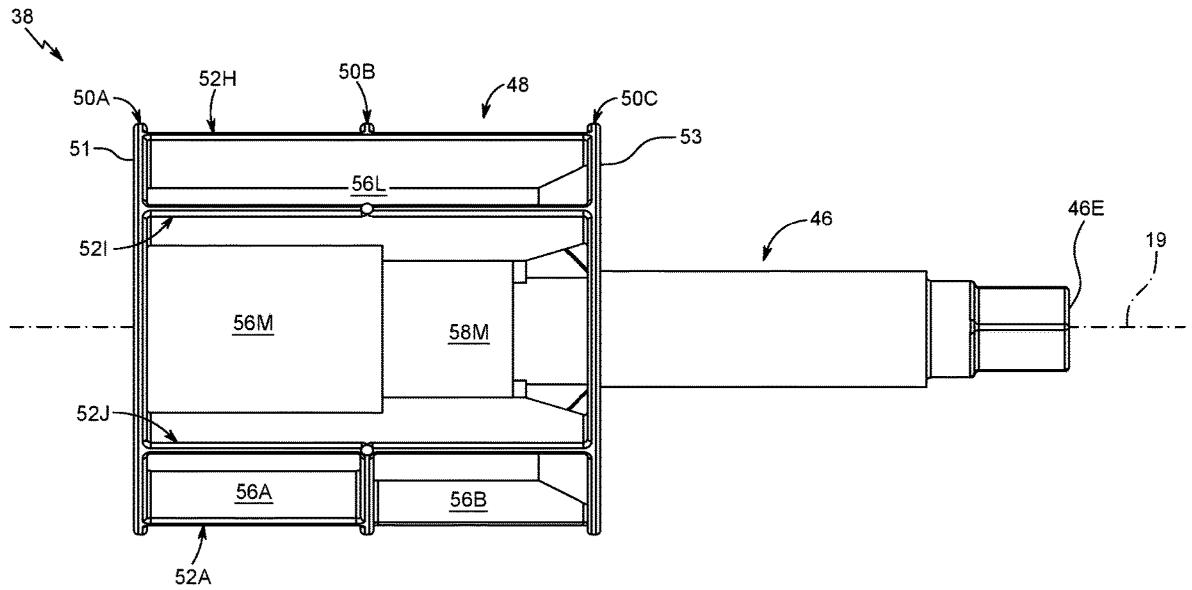
FIG. 6D is an elevation view of the main valve rotor in FIG. 6C rotated 90 degrees about the valve axis compared to FIG. 6C to show the different chambers defined by the different circumferential and axial flow divider walls that extends radially outward away from the first valve rotor drum.

The first valve rotor 38 includes a first valve rotor body 44 and a first valve shaft 46 that extends axially from the first valve rotor body 44 as shown in FIGS. 5-6D. The first valve shaft 46 extends axially through the partition wall 32 of the valve housing body 20, through the second valve rotor 40, and through the second housing end cover 24 to a terminal end 46E. The terminal end 46E is located outside of the second housing end cover 24 in the illustrative embodiment to couple to the actuator 29.

The first valve rotor body 44 includes a first valve rotor drum 48, a plurality of circumferential flow divider walls 50A-C, and a plurality of axial flow dividers walls 52A-K as shown in FIGS. 6A-D. The first valve rotor drum 48 extends circumferentially about the valve axis 19 and is hollow to define a rotor drum cavity 54. The plurality of circumferential flow divider walls 50A-C are spaced apart axially along the first valve rotor drum 48. Each of the circumferential flow dividers walls 50A-C extend radially outward from and circumferentially at least partway around the first valve rotor drum 48. The plurality of axial flow divider walls 52A-K are spaced apart circumferentially around the first valve rotor drum 48. The plurality of axial flow divider walls 52A-K extend axially between the plurality of circumferential flow divider walls 50 to define a plurality of chambers 56.

The plurality of circumferential flow divider walls 50A-C includes a first circumferential flow divider wall 50A, a second circumferential flow divider wall 50B, and a third circumferential flow divider wall 50C as shown in FIGS. 6A-6D. The first circumferential flow divider wall 50A extends radially outward from and circumferentially all the way around the first valve rotor drum 48 at a first axial end 51 of the first valve rotor drum 48. The second circumferential flow divider wall 50B extends radially outward from and circumferentially all the way around the first valve rotor drum 48 at a second axial end 53 of the first valve rotor drum 48. The third circumferential flow divider wall 50C extends radially outward from and circumferentially only partway around the first valve rotor drum 48 axially between the first and second circumferential flow divider walls 50A, 50B.

The plurality of axial flow divider walls 52A-K includes at least ten different axial flow divider walls 52A-K spaced apart circumferentially around the first valve rotor drum 48 as shown in FIGS. 6A-D. Most of the plurality of axial flow divider walls 52A-K extend axially between the first and second axial ends 51, 53 of the first valve rotor drum 48 and interconnect the first and second circumferential flow divider walls 50A, 50B. Other axial flow divider walls 52D, 52F, 52H only extend axially partway along the first valve rotor drum 48 between the first and third circumferential flow divider walls 50A, 50C.

The different chambers 56A-M are defined between the different circumferential flow divider walls 50A-C and axial flow divider walls 52A-K as shown in FIGS. 6A-D. The plurality of chambers 56A-M includes at least thirteen different chambers 56A-M that range in size.

In the illustrative embodiment, the first valve rotor drum 48 is formed to include openings 58B, 58E, 58H, 58J, 58M as shown in FIGS. 6A-D. The openings 58B, 58E, 58H, 58J, 58M extend through the first valve rotor drum 48 and open into the rotor drum cavity 54. Each of the openings 58B, 58E, 58H, 58J, 58M corresponds to one of the chambers 56B, 56E, 56H, 56J, 56M. Each of the chambers 56B, 56E, 56H, 56J, 56M is in fluid communication with the rotor drum cavity 54 through the openings 58B, 58E, 58H, 58J, 58M.

As the first valve rotor 38 rotates, the first valve rotor plate 50 controls the flow to each aperture 36A, 36B, 36C, 36D, 36E formed in the valve housing body 20 as shown in FIGS. 15-24C. The first valve rotor plate 50 controls the flow to each aperture 36A, 36B, 36C, 36D, 36E by aligning different chambers 56A-M with the different apertures 36A, 36B, 36C, 36D, 36E in the different predetermined positions. This controls which apertures 36A, 36B, 36C, 36D, 36E are in fluid communication with the rotor drum cavity 54 or with one of the other apertures 36A, 36B, 36C, 36D, 36E.

The first aperture 36A is always in fluid communication with the rotor drum cavity 54 in the illustrative embodiment. The fluid flows to/from the first aperture 36A through the aperture 22A formed in the first end housing cover 22 and into the rotor drum cavity 54.

In some positions, portions of the first valve rotor plate 50 surrounds one of the other apertures 36B, 36C, 36D, 36E formed in the valve housing body 20 to block the flow of fluid therethrough. Some of the chambers 56A-M are sized to cover only the one aperture 36B, 36C, 36D, 36E in certain predetermined positions so that the flow of fluid is blocked from flowing into/out of the rotor drum cavity 54 or is blocked from flowing between apertures 36B, 36C, 36D, 36E.

The second valve rotor 40 includes a second valve rotor plate 60, a second valve shaft 62, and a plurality of second valve rotor walls 64, 66, 68 as shown in FIGS. 7 and 8. The second valve rotor plate 60 extends circumferentially about the valve axis 19. The second valve shaft 62 extends axially away from the second valve rotor plate 60 to a terminal end 62E. The second valve shaft 62 extends through the second housing end cover 24 to so that the terminal end 62E is located outside of the second housing end cover 24. Each of the second valve rotor walls 64, 66, 68 extend axially away from the second valve rotor plate 60 in the same direction as the second valve shaft 62. The second valve rotor walls 64, 66, 68 are spaced apart circumferentially to define a plurality of second valve rotor ports 65, 67, 69.

In the illustrative embodiment, the first valve shaft 46 extends through the second valve shaft 62 of the second valve rotor 40 as shown in FIG. 15. The first valve shaft 46 extends axially past the thermal end 62E of the second valve shaft 62. The different motors in the nested actuator 29 couple to the terminal ends 46E, 62E of the respective shafts 46, 62.

The second valve rotor plate 60 is formed to define a second rotor through hole 70 as shown in FIGS. 7 and 8. The second rotor through hole 70 extends axially through the second valve rotor plate 60 relative to the valve axis 19 so that the flow of fluid is able to flow axially through the second valve rotor 40 parallel to the valve axis 19. The second rotor through hole 70 extends circumferentially partway about the valve axis 19 in the illustrative embodiment.

Each of the second valve rotor walls 64, 66, 68 extends axially away from the second valve rotor plate 60 to a terminal end 64E, 66E, 68E as shown in FIGS. 7 and 8. The terminal ends 64E, 66E, 68E of each of the second valve rotor walls 64, 66, 68 is spaced apart axially from the terminal end 62E of the second valve shaft 62 such that the second valve rotor walls 64, 66, 68 do not extend past the second housing end cover 24.

As the second valve rotor 40 rotates, the second valve rotor plate 60 controls the flow of fluid through the connecting aperture 32A, while the second valve rotor walls 64, 66, 68 vary the amount of fluid flowing through the apertures 36F, 36G formed in the valve housing body 20 as shown in FIGS. 11-14. The different valve rotor walls 64, 66, 68 partially open, fully open, or close the apertures 36F, 36G in the different predetermined positions to control the flow of fluid therethrough. In some positions, a portion of the second valve rotor plate 60 covers the connecting aperture 32A to block the flow of fluid therethrough.

The different modes of the multi-way valve 10 are shown in FIG. 10. The first mode (mode A) and the second mode (mode B1) are shown in FIG. 10A. The third mode (mode B2) and the fifth mode (mode C) are shown in FIG. 10A. The fourth mode (mode B3) is shown in FIG. 10C. The sixth mode (mode D) is shown in FIG. 10D. The seventh mode (mode E) is shown in FIG. 10E.

In modes A and B1, the main valve rotor 38 is in a MAIN VALVE ROTOR FIRST position as shown in FIGS. 15-16C and the throttle valve rotor 40 is in a THROTTLE VALVE ROTOR FIRST position as shown in FIG. 11. In the MAIN VALVE ROTOR FIRST position, the main valve rotor 38 connects the first aperture 36A to the second aperture 36B, connects the third aperture 36C and the fifth aperture 36E, and blocks the fourth aperture 36D to form the first flow path. One of the chambers 56 surrounds the third aperture 36C and the fifth aperture 36E to connect the third and fifth apertures, 36C, 36E in fluid communication. Another one of the chambers 56 surrounds the fourth aperture 36D to block the flow of fluid to the fourth aperture 36D.

In the THROTTLE VALVE ROTOR FIRST position, the throttle valve rotor 40 covers the connecting aperture 32A to block flow between the first and second valve cavities 26, 28 through the connecting aperture 32A formed in the partition wall 32 and connects the sixth aperture 36F and the seventh aperture 36G. The second valve rotor ports 65, 67 align with the sixth and seventh apertures 36F, 36G to allow the flow of fluid between the sixth aperture 36F and the seventh aperture 36G.

In mode B2, the main valve rotor 38 stays in the MAIN VALVE ROTOR FIRST position, while the throttle valve rotor 40 moves to a THROTTLE VALVE ROTOR SECOND position as shown in FIG. 12. In the THROTTLE VALVE ROTOR SECOND position, the throttle valve rotor 40 has rotated about the valve axis 19 to uncover the connecting aperture 32A to align the hole 70 with the connecting aperture 32A. This allows flow between the first and second valve cavities 26, 28 through the connecting aperture 32A formed in the partition wall 32 and the hole 70. Simultaneously, one of the second valve rotor walls 64 covers the sixth aperture 36F to block flow through the sixth aperture 36F, while one of the second valve rotor ports 69 aligns with the seventh aperture 36G. In this way, the seventh aperture 36G is in fluid communication with the first aperture 36A.

In mode B3, the main valve rotor 38 stays in the MAIN VALVE ROTOR FIRST position and the throttle valve rotor 40 moves to a THROTTLE configuration as shown in FIG. 13. In the THROTTLE configuration, the throttle valve rotor 40 has rotated to uncover the sixth aperture 36F, while keeping the hole 70 formed in the throttle valve rotor 40 aligned with the connecting aperture 32A. In the THROTTLE configuration, the second valve rotor port 69 aligns with both the sixth aperture 36F and the seventh aperture 36G to allow the flow of fluid therethrough. However, in the THROTTLE configuration, the throttle valve rotor 40 can rotate about the valve axis 19 to vary, or throttle, the flow through the sixth and seventh apertures 36F, 36G. The second valve rotor walls 64, 68 may block a portion of the corresponding aperture 36F, 36G to vary the flow therethrough.

In mode C, the main valve rotor 38 is in the MAIN VALVE ROTOR FIRST position and the throttle valve rotor 40 is in the THROTTLE VALVE ROTOR SECOND position. However, the direction of the flow between the third aperture 36C and the fifth aperture 36E may have reversed as suggested in FIG. 10.

In mode D, the throttle valve rotor 40 is in the THROTTLE VALVE ROTOR FIRST position, while the main valve rotor 38 moves to a MAIN VALVE ROTOR SECOND position as shown in FIG. 17-18C. In the MAIN VALVE ROTOR SECOND position, the main valve rotor 38 has rotated to connect the second aperture 36B and the third aperture 36C, to connect the first aperture 36A and the fourth aperture 36D, to block the fifth aperture 36E. One of the chambers 56 surrounds the second and third apertures 36B, 36C to connect the second and third apertures 36B, 36C in fluid communication. Another one of the chambers 56 surrounds the fifth aperture 36E to block the flow of fluid to the fifth aperture 36E.

In mode E, the main valve rotor 38 moves to a MAIN VALVE ROTOR THIRD position as shown in FIGS. 19-20C, while the throttle valve rotor 40 is in the THROTTLE configuration. In the MAIN VALVE ROTOR THIRD position, the main valve rotor 38 has rotated to connect all the apertures 36A-G. One of the chambers 56 surrounds the second aperture 36B, the third aperture 36C, the fourth aperture 36D, and the fifth aperture 36E and the chamber 56 has the opening 58 so that the apertures 36B-E are in fluid communication with the first aperture 36A.

The multi-way valve 10 and/or each of the actuators 29 may include the control unit configured to direct the actuators 29 to move each of the valve rotors 38, 40 to the different predetermined positions in each of the different modes A-E. Based on where the vehicle needs fluid, the control unit would direct the actuators 29 to move each of the valve rotors 38, 40 to one of the positions for the desired mode.

The first and second sealing systems 16, 18 help seal between the valve housing 12 and the first and second valve rotors 38, 40 in the different predetermined positions as shown in FIGS. 25-28A. The first sealing system 16 seals between the valve housing body 20 and the first valve rotor 38. The second sealing system 18 seals between the partition wall 32 of the valve housing body 20 and the second valve rotor 40.

The first sealing system 16 includes the first seal 72 and a first biasing assembly 74 as shown in FIGS. 27-28A. The first seal 72 is located radially between the first valve rotor 38 and the valve housing body 20. The first seal 72 extends axially between the first and second ends 51, 53 of the first valve rotor 50 and extends circumferentially partway about the valve axis 19. The first biasing assembly 74 is configured to selectively apply a radial force F R on the first valve rotor 38 to urge the first valve rotor 38 toward the base 34 of the valve housing body 20 when the first valve rotor 38 is in one of the plurality of different predetermined positions so as to increase sealing between the first valve rotor 38 and the valve housing body 20. This radial force F R is applied to urge the first valve rotor 38 into engagement with the first seal 72 when the first valve rotor 38 is in one of the plurality of different predetermined positions to improve sealing between the first valve rotor 38 and the valve housing body 20.

The first seal 72 surrounds each of the plurality of apertures 36B, 36C, 36D, 36E formed in the valve housing body 20. In the illustrative embodiment, the first seal 72 includes holes that align with the apertures 36B, 36C, 36D, 36E in the valve housing body 20 as shown in FIGS. 15-24C.

The first biasing assembly 74 selectively applies the radial force F R to increase friction between the first valve rotor 38 and the first seal 72 at the different predetermined positions, but removes the radial force F R when the first valve rotor 38 rotates to reduce the friction between the first valve rotor 38 and the first valve seal 72. In this way, the torque needed to rotate the first valve rotor 38 is reduced and the wear on the first seal 72 is reduced.

Similarly, the second sealing system 18 includes a second seal 76 and a second biasing assembly 78 as shown in FIGS. 25-26A. The second seal 76 is located in the connecting aperture 32A formed in the partition wall 32 of the valve housing body 20 to engage an axially facing surface 60S of the second valve rotor 40. In the illustrative embodiment, the second seal 76 is press fit into the connecting aperture 32A formed in the partition wall 32 of the valve housing body 20 to engage an axially facing surface 60S of the second valve rotor 40. The second biasing assembly 78 is configured to selectively apply an axial force FA on the second valve rotor 40 to urge the second valve rotor 40 toward the partition wall 32 of the valve housing body 20 when the second valve rotor 40 is in one of the plurality of different predetermined positions so as to increase sealing between the second valve rotor 40 and the valve housing body 20. The axial force FA is applied to urge the second valve rotor 40 into engagement with the second seal 76 when the second valve rotor 40 is in one of the plurality of different predetermined positions to improve sealing between the second valve rotor 40 and the partition wall 32 of the valve housing body 20.

The biasing assembly 78 selectively applies the axial force FA to increase friction between the second valve rotor 40 and the seals at the different predetermined positions, but removes the axial force FA when the second valve rotor 40 rotates to reduce the friction between the second valve rotor 40 and the second seal 78. In this way, the torque needed to rotate the second valve rotor 40 is reduced and the wear on the second seal 78 is reduced.

In the illustrative embodiment, the first and second seals 72, 76 comprise a Teflon material. In some embodiments, the seals may be made of another suitable material.

In other multi-way seals, large amounts of Teflon material may be used to seal the different passages, which can make manufacturing the multi-way valve expensive. Therefore, by reducing the amount of friction on the first and second seals 72, 76 during rotation of the first and second valve rotors 38, 40, wear on the first and second seals 72, 76 is reduced. This reduces the need to replace the first and second seals 72, 76 as well and reduces the cost of repairing the multi-way valve 10.

Turning again to the first sealing system 16, the biasing assembly 74 includes a ridge 80 and a plurality of protrusions 82 as shown in FIGS. 27-28A. The ridge 80 extends radially inward from and axially along the annular outer wall 30 of the valve housing body 20. The ridge 80 extends radially inward from the annular outer wall 30 opposite the apertures 36A-E. The plurality of protrusions 82 extend radially outward from the first valve rotor 38 and are configured to engage the ridge 80 on the valve housing body 20 as the first valve rotor 38 rotates about the valve axis 19 to the plurality of different predetermined positions.

In the illustrative embodiment, the protrusions 82 are located at the intersection of the third circumferential flow divider wall 50C and the different axial flow divider walls 52A-K. The protrusions 82 are spaced apart circumferentially around the first valve rotor body 50. In the illustrative embodiment, the protrusions 82 are spaced apart at about 72 degree intervals around the first valve rotor 38.

The ridge 80 is fixed to the valve housing body 20. Each of the protrusions 82 on the first valve rotor 38 rides against the ridge 80 as the first valve rotor 38 is rotated and applies downward radial force F R to the first valve rotor 38 when aligned with the ridge 80 on the valve housing body 20. This radial force F R generates a contact pressure between the first valve rotor 38 and the elastomer seal 74. The increased contact pressure and resulting increase in friction are only generated when the ridge 80 is aligned with one of the protrusions 82 on the first valve rotor 38. This reduces friction and torque on the actuator 29 during movement between seal points.

In some embodiments, the ridge 80 and the protrusions 82 may be interchangeable. The ridge 80 and the protrusions 82 may be interchangeable such that the ridge 80 is formed on the first valve rotor 38 and the protrusion 82 is formed on the valve housing body 20.

Turning again to the second sealing system 18, the second biasing assembly 78 includes cam ramps 86 and a plurality of cam surfaces 88, 90, 92 as shown in FIGS. 7, 8, and 25-26A. The cam ramps 86 are formed on an axially facing 24S surface of the second housing end cover 24 of the valve housing body 20. The cam ramps 86 are equally spaced apart circumferentially about the valve axis 19. Each cam surface 88, 90, 92 is formed on one of the second valve rotor walls 64, 66, 68. The cam surfaces 88, 90, 92 are configured to engage the cam ramps 86 on the second housing end cover 24 as the second valve rotor 40 rotates about the valve axis 19 to the plurality of different predetermined positions.

In this way, the raised portions 88P, 90P, 92P of each of the cam surfaces 88, 90, 92 engages one of the cam ramps 86 in each of the different predetermined positions to cause the axial force FA to be applied to the second valve rotor 40. Then as the second valve rotor 40 rotates about the valve axis 19, the raised portions 88P, 90P, 92P of the cam surfaces 88, 90, 92 disengage the cam ramps 86 so that the axial force FA is removed and the torque needed to rotate the second valve rotor 40 is reduced.

The cam ramps 86 are fixed on the second housing end cover 24. The cam surfaces 88, 90, 92 on the second valve rotor 40 rides against the cam ramps 86 in a circular manner and applies downward axial force FA to the second valve rotor 40 when aligned with the high point 88P, 90P, 92P of the cam surfaces 88, 90, 92. This force FA generates a contact pressure between the underside of the second valve rotor 40 and the elastomer seal 76 press-fit into the partition wall 32 of the valve housing body 20. The increased contact pressure and resulting increase in friction are only generated when each high point 88P, 90P, 92P of the cam surfaces 88, 90, 92 is aligned with a cam ramp 86. This reduces friction and torque on the actuator 29 during movement between seal points.

The invention claimed is:

1. A multi-way valve comprising a valve housing coupled to a manifold of thermal fluid circuits, the valve housing including a valve housing body, a first housing end cover coupled to a first end of the valve housing body, and a second housing end cover coupled to a second end of the valve housing spaced apart axially from the first end of the valve housing relative to a valve axis, the valve housing body shaped to define a first valve cavity, a second valve cavity in fluid communication with the first valve cavity, and a plurality of apertures that open into the first and second valve cavities, the first housing end cover coupled to the first end of the valve housing to close a first end opening to the first valve cavity, and the second housing end cover coupled to the second end of the valve housing to close a second end opening to the second valve cavity, and a valve flow controller includes a first valve rotor arranged in the first valve cavity of the valve housing body and a second valve rotor arranged in the second valve cavity of the valve housing body, the first and second valve rotors configured to rotate relative to the valve housing body about the valve axis, and the first and second valve rotors cooperate to define a plurality of flow paths when the first and second valve rotors are rotated about the valve axis to a plurality of different predetermined positions to control a flow of fluid through the valve housing, wherein the valve housing body includes an annular outer wall that extends around the valve axis to define a hollow space, a partition wall located in the hollow space of the annular outer wall to divide the hollow space into the first valve cavity and the second valve cavity, and a housing base that extends from the annular outer wall and formed to define the plurality of apertures, and wherein the partition wall is formed to include a connecting aperture in fluid communication with the first valve cavity and the second valve cavity of the valve housing body.

2. The multi-way valve of claim 1, wherein the first valve rotor includes a first valve rotor body and a first valve shaft that extends axially from the first valve rotor body through the partition wall of the valve housing and the second valve rotor to a terminal end located outside of the second housing end cover of the valve housing.

3. The multi-way valve of claim 2, wherein the first valve rotor body of the first valve rotor includes a first valve rotor drum that extends circumferentially about the valve axis, a plurality of circumferential flow divider walls spaced apart axially along the first valve rotor drum that extend radially outward from and circumferentially at least partway around the first valve rotor drum, and a plurality of axial flow divider walls that extend axially between the plurality of circumferential flow divider walls to define a plurality of chambers therebetween.

4. The multi-way valve of claim 2, wherein the second valve rotor includes a second valve rotor plate and a plurality of second valve rotor walls that extend axially away from the second valve rotor plate and spaced apart circumferentially to define a plurality of second valve ports, and wherein the second valve rotor plate is formed to include a second rotor through hole that extends axially through the second valve rotor relative to the valve axis so that the flow of fluid is able to flow axially through the second valve rotor parallel to the valve axis.

5. The multi-way valve of claim 1, further comprising a first sealing system configured to seal between the first valve rotor and the valve housing body, the first sealing system including a first seal located radially between the first valve rotor and the valve housing body that surrounds each of the plurality of apertures formed in the valve housing body.

6. The multi-way valve of claim 5, wherein the first sealing system further includes first biasing means for applying a radial force on the first valve rotor to urge the first valve rotor into engagement with the first seal when the first valve rotor is in one of the plurality of different predetermined positions to improve sealing between the first valve rotor and the valve housing body and for removing the radial force on the first valve rotor to reduce friction between the first valve rotor and the first seal when the first valve rotor is rotated about the valve axis from one position to another position included in the plurality of different predetermined positions.

7. The multi-way valve of claim 6, wherein the first biasing means includes a ridge that extends radially inward from and axially along the annular outer wall of the valve housing and a plurality of protrusions that extend radially outward from the first valve rotor and configured to engage the ridge on the valve housing body as the first valve rotor rotates about the valve axis to the plurality of different predetermined positions.

8. The multi-way valve of claim 5, further comprising a second sealing system configured to seal between the second valve rotor and the valve housing body, the second sealing system including a second seal is press fit into the connecting aperture formed in the partition wall of the valve housing body to engage an axially facing surface of the second valve rotor.

9. The multi-way valve of claim 8, wherein the second sealing system further includes second biasing means for applying an axial force on the second valve rotor to urge the second valve rotor into engagement with the second seal when the second valve rotor is in one of the plurality of different predetermined positions to improve sealing between the second valve rotor and the partition wall of the valve housing body and for removing the axial force on the second valve rotor to reduce friction between the second valve rotor and the second seal when the second valve rotor is rotated about the valve axis from one position to another position included in the plurality of different predetermined positions.

10. The multi-way valve of claim 9, wherein the second biasing means includes cam ramps on an axially facing surface of the second housing end cover of the valve housing and a plurality of cam surfaces on the second valve rotor configured to engage the cam ramps on the second housing end cover as the second valve rotor rotates about the valve axis to the plurality of different predetermined positions.

11. The multi-way valve of claim 5, the first sealing system further comprising a first biasing assembly configured to selectively apply a radial force on the first valve rotor to urge the first valve rotor into engagement with the first seal when the first valve rotor is in one of the plurality of different predetermined positions to improve sealing between the first valve rotor and the valve housing body.

12. The multi-way valve of claim 11, wherein the first biasing assembly includes a ridge that extends radially inward from and axially along the annular outer wall of the valve housing and a plurality of protrusions that extend radially outward from the first valve rotor and configured to engage the ridge on the valve housing body as the first valve rotor rotates about the valve axis to the plurality of different predetermined positions.

13. The multi-way valve of claim 12, further comprising a second sealing system configured to seal between the second valve rotor and the valve housing body, the second sealing system including a second seal press fit into the connecting aperture formed in the partition wall of the valve housing body to engage an axially facing surface of the second valve rotor and a second biasing assembly configured to selectively apply an axial force on the second valve rotor to urge the second valve rotor into engagement with the second seal when the second valve rotor is in one of the plurality of different predetermined positions to improve sealing between the second valve rotor and the partition wall of the valve housing body.

14. The multi-way valve of claim 13, wherein the second biasing assembly includes cam ramps on an axially facing surface of the second housing end cover of the valve housing and a plurality of cam surfaces on the second valve rotor configured to engage the cam ramps on the second housing end cover as the second valve rotor rotates about the valve axis to the plurality of different predetermined positions.

15. A multi-way valve comprising:

a valve housing coupled to a manifold of thermal fluid circuits, the valve housing including a valve housing body, a first housing end cover coupled to a first end of the valve housing body, and a second housing end cover coupled to a second end of the valve housing spaced apart axially from the first end of the valve housing relative to a valve axis, the valve housing body shaped to define a first valve cavity, a second valve cavity in fluid communication with the first valve cavity, and a plurality of apertures that open into the first and second valve cavities, the first housing end cover coupled to the first end of the valve housing to close a first end opening to the first valve cavity, and the second housing end cover coupled to the second end of the valve housing to close a second end opening to the second valve cavity, and a valve flow controller includes a first valve rotor arranged in the first valve cavity of the valve housing body and a second valve rotor arranged in the second valve cavity of the valve housing body, the first and second valve rotors configured to rotate relative to the valve housing body about the valve axis, and the first and second valve rotors cooperate to define a plurality of flow paths when the first and second valve rotors are rotated about the valve axis to a plurality of different predetermined positions to control a flow of fluid through the valve housing, wherein the second valve rotor includes a second valve rotor plate and a plurality of second valve rotor walls that extend axially away from the second valve rotor plate and spaced apart circumferentially to define a plurality of second valve ports, and wherein the second valve rotor plate is formed to include a second rotor through hole that extends axially through the second valve rotor relative to the valve axis so that the flow of fluid is able to flow axially through the second valve rotor parallel to the valve axis.

16. The multi-way valve of claim 15, wherein the first valve rotor includes a first valve rotor body and a first valve shaft that extends axially from the first valve rotor body through the second valve rotor to a terminal end located outside of the second housing end cover of the valve housing, the first valve rotor body including a first valve rotor drum that extends circumferentially about the valve axis, a plurality of circumferential flow divider walls spaced apart axially along the first valve rotor drum that extend radially outward from and circumferentially at least partway around the first valve rotor drum, and a plurality of axial flow divider walls that extend axially between the plurality of circumferential flow divider walls to define a plurality of chambers therebetween.

17. A multi-way valve comprising a valve housing that extends axially along a valve axis, the valve housing formed to include a first valve cavity and a second valve cavity in fluid communication with the first valve cavity, a valve flow controller includes a first valve rotor arranged in the first valve cavity of the valve housing and a second valve rotor arranged in the second valve cavity of the valve housing, the first and second valve rotors configured to rotate relative to the valve housing about the valve axis, and the first and second valve rotors cooperate to define a plurality of flow paths when the first and second valve rotors are rotated about the valve axis to a plurality of different predetermined positions to control a flow of fluid through the valve housing, and a first sealing system configured to seal between the first valve rotor and the valve housing in the first valve cavity, the first sealing system including a first seal located radially between the first valve rotor and the valve housing that extends circumferentially at least partway about the valve axis and a first biasing assembly configured to selectively apply a radial force on the first valve rotor to urge the first valve rotor into engagement with the first seal when the first valve rotor is in one of the plurality of different predetermined positions to improve sealing between the first valve rotor and the valve housing.

18. The multi-way valve of claim 17, wherein the first biasing assembly includes a ridge that extends radially inward from and axially along the valve housing opposite the first seal and a plurality of protrusions that extend radially outward from the first valve rotor and configured to engage the ridge on the valve housing as the first valve rotor rotates about the valve axis to the plurality of different predetermined positions.

19. The multi-way valve of claim 18, wherein the plurality of protrusions are spaced apart at 72 degree intervals around the first valve rotor.

20. The multi-way valve of claim 17, further comprising a second sealing system configured to seal between the second valve rotor and the valve housing, the second sealing system including a second seal located axially between the second valve rotor and the valve housing.

21. The multi-way valve of claim 20, wherein the second sealing system further includes a second biasing assembly configured to selectively apply an axial force on the second valve rotor to urge the second valve rotor into engagement with the second seal when the second valve rotor is in one of the plurality of different predetermined positions to improve sealing between the second valve rotor and the valve housing.

22. The multi-way valve of claim 21, wherein the second biasing assembly includes cam ramps on an axially facing surface of the valve housing and a plurality of cam surfaces on the second valve rotor configured to engage the cam ramps on the valve housing as the second valve rotor rotates about the valve axis to the plurality of different predetermined positions.

23. The multi-way valve of claim 20, wherein the valve housing including a valve housing body shaped to define the first valve cavity and the second valve cavity, a first housing end cover coupled to a first end of the valve housing to close off the first valve cavity, and a second end cover coupled to a second end of the valve housing spaced apart axially from the first end of the valve housing relative to the valve axis to close off the second valve cavity, and wherein the valve housing body, wherein the valve housing body includes an annular outer wall that extends around the valve axis to define a hollow space, a partition wall located in the hollow space of the annular outer wall to divide the hollow space into the first valve cavity and the second valve cavity, and a housing base that extends from the annular outer wall and formed to define a plurality of apertures, and wherein the second seal is press fit into a connecting aperture formed in the partition wall of the valve housing body.

24. The multi-way valve of claim 23, wherein the second sealing system further includes a second biasing assembly configured to selectively apply an axial force on the second valve rotor to urge the second valve rotor into engagement with the second seal when the second valve rotor is in one of the plurality of different predetermined positions to improve sealing between the second valve rotor and the valve housing.

25. The multi-way valve of claim 24, wherein the second biasing assembly includes cam ramps on an axially facing surface of the valve housing and a plurality of cam surfaces on the second valve rotor configured to engage the cam ramps on the valve housing body as the second valve rotor rotates about the valve axis to the plurality of different predetermined positions.

26. The multi-way valve of claim 23, wherein the first valve rotor includes a first valve rotor body and a first valve shaft that extends axially from the first valve rotor body through the partition wall of the valve housing and the second valve rotor to a terminal end located outside of the second end cover of the valve housing.

27. The multi-way valve of claim 26, wherein the first valve rotor body of the first valve rotor includes a first valve rotor drum that extends circumferentially about the valve axis, a plurality of circumferential flow divider walls spaced apart axially along the first valve rotor drum that extend radially outward from and circumferentially at least partway around the first valve rotor drum, and a plurality of axial flow divider walls that extend axially between the plurality of circumferential flow divider walls to define a plurality of chambers therebetween.

28. The multi-way valve of claim 20, wherein the second valve rotor includes a second valve rotor plate and a plurality of second valve rotor walls that extend axially away from the second valve rotor plate and spaced apart circumferentially to define a plurality of second valve ports, and wherein the second valve rotor plate is formed to include a second rotor through hole that extends axially through the second valve rotor relative to the valve axis so that the flow of fluid is able to flow axially through the second valve rotor parallel to the valve axis.

* * * * *